United States Patent
Liu et al.

(10) Patent No.: US 12,426,016 B2
(45) Date of Patent: Sep. 23, 2025

(54) DISTRIBUTED MULTI-ENCODER NETWORK CODING DESIGN

(71) Applicant: QUALCOMM Incorporated, San Diego, CA (US)

(72) Inventors: Guangyi Liu, San Diego, CA (US); Gabi Sarkis, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 693 days.

(21) Appl. No.: 17/685,265

(22) Filed: Mar. 2, 2022

(65) Prior Publication Data
US 2023/0284189 A1    Sep. 7, 2023

(51) Int. Cl.
*H04W 72/0446* (2023.01)

(52) U.S. Cl.
CPC ............... *H04W 72/0446* (2013.01)

(58) Field of Classification Search
CPC .................................. H04W 72/0446
See application file for complete search history.

(56) References Cited

U.S. PATENT DOCUMENTS

| | | | |
|---|---|---|---|
| 9,819,454 B2 * | 11/2017 | Jain | H04L 1/1822 |
| 2022/0021491 A1 | 1/2022 | Zhou | |
| 2022/0052788 A1 | 2/2022 | Paladugu et al. | |
| 2024/0080708 A1 * | 3/2024 | Rao | H04W 28/0268 |

OTHER PUBLICATIONS

International Search Report and Written Opinion—PCT/US2023/060830—ISA/EPO—May 11, 2023.
QUALCOMM: "On Coding Evolution for Rel-18 & Beyond", 3GPP TSG RAN Rel-18 Workshop, RWS-210028, 3rd Generation Partnership Project, Mobile Competence Centre, 650, Route Des Lucioles, F-06921 Sophia-Antipolis Cedex, France, vol. TSG RAN, No. Electronic Meeting, Jun. 28, 2021-Jul. 2, 2021, Jun. 7, 2021, 12 Pages, XP052025594, pp. 3-10.
Wang R., et al., "An Overview on Multiway Relay Communications: Fundamental Issues, Recent Advances, and New Challenges", arxiv.org, Cornell University Library, 201 Olin Library Cornell University Ithaca, NY 14853, Oct. 9, 2020, 24 Pages, XP081782295, Sections I, III.

* cited by examiner

*Primary Examiner* — Rhonda L Murphy
(74) *Attorney, Agent, or Firm* — Holland & Hart LLP

(57) ABSTRACT

Methods, systems, and devices for wireless communications are described. A network node may store, in a first buffer, a first set of transport blocks (TBs) received at the network node over a wireless channel during a first time window. The network node may store, in a second buffer, a second set of TBs received at the network node over the wireless channel during a second time window and according to at least one monitoring criterion. The network node may receive a first set of one or more network coding messages over the wireless channel. The network node may decode the first set of one or more network coding messages based on the first set of TBs in the first buffer. The network node may transmit a second set of one or more network coding messages corresponding to a portion of the second set of TBs in the second buffer.

30 Claims, 13 Drawing Sheets

DISTRIBUTED MULTI-ENCODER NETWORK CODING DESIGN

FIELD OF TECHNOLOGY

The following relates to wireless communications, including a distributed multi-encoder network coding design.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). Some wireless communications systems may support network coding techniques for improving system capacity and resource utilization within the wireless communications systems.

SUMMARY

The described techniques relate to improved methods, systems, devices, and apparatuses that support a distributed multi-encoder network coding design. For example, the described techniques provide increased network coding and signaling efficiency in a wireless communications system with multiple network encoders. For example, a network node (e.g., a network encoder) may store a first set of transport blocks (TBs) in a first buffer. The first set of TBs may be received at the network node over a wireless channel during a first time window. The network node may store a second set of TBs in a second buffer. The second set of TBs may be received at the network node over the wireless channel during a second time window and according to at least one monitoring criterion. The network node may receive a first set of one or more network coding messages over the wireless channel. As part of receiving the first set of one or more network coding messages, the network node may decode the first set of one or more network coding messages based on the first set of TBs in the first buffer. The network node may transmit a second set of one or more network coding messages that may correspond to a portion of the second set of TBs in the second buffer. The portion may be selected from the second set of TBs based on the first set of one or more network coding messages. As a result, the network node may increase system capacity and resource utilization within a wireless communications system, among other benefits.

A method for wireless communication at a network node is described. The method may include storing in a first buffer a first set of TBs received at the network node over a wireless channel during a first time window, storing in a second buffer a second set of TBs received at the network node over the wireless channel during a second time window according to at least one monitoring criterion, receiving a first set of one or more network coding messages over the wireless channel, where receiving the first set of one or more network coding messages includes decoding the first set of one or more network coding messages based on the first set of TBs in the first buffer, and transmitting a second set of one or more network coding messages corresponding to a portion of the second set of TBs in the second buffer, where the portion is selected based on the first set of one or more network coding messages.

An apparatus for wireless communication at a network node is described. The apparatus may include a processor, memory coupled with the processor, and instructions stored in the memory. The instructions may be executable by the processor to cause the apparatus to store in a first buffer a first set of TBs received at the network node over a wireless channel during a first time window, store in a second buffer a second set of TBs received at the network node over the wireless channel during a second time window according to at least one monitoring criterion, receive a first set of one or more network coding messages over the wireless channel, where receiving the first set of one or more network coding messages includes decoding the first set of one or more network coding messages based on the first set of TBs in the first buffer, and transmit a second set of one or more network coding messages corresponding to a portion of the second set of TBs in the second buffer, where the portion is selected based on the first set of one or more network coding messages.

Another apparatus for wireless communication at a network node is described. The apparatus may include means for storing in a first buffer a first set of TBs received at the network node over a wireless channel during a first time window, means for storing in a second buffer a second set of TBs received at the network node over the wireless channel during a second time window according to at least one monitoring criterion, means for receiving a first set of one or more network coding messages over the wireless channel, where receiving the first set of one or more network coding messages includes decoding the first set of one or more network coding messages based on the first set of TBs in the first buffer, and means for transmitting a second set of one or more network coding messages corresponding to a portion of the second set of TBs in the second buffer, where the portion is selected based on the first set of one or more network coding messages.

A non-transitory computer-readable medium storing code for wireless communication at a network node is described. The code may include instructions executable by a processor to store in a first buffer a first set of TBs received at the network node over a wireless channel during a first time window, store in a second buffer a second set of TBs received at the network node over the wireless channel during a second time window according to at least one monitoring criterion, receive a first set of one or more network coding messages over the wireless channel, where receiving the first set of one or more network coding messages includes decoding the first set of one or more network coding messages based on the first set of TBs in the first buffer, and transmit a second set of one or more network coding messages corresponding to a portion of the second set of TBs in the second buffer, where the portion is selected based on the first set of one or more network coding messages.

Some examples of the method, apparatuses, and non-transitory computer-readable medium described herein may further include operations, features, means, or instructions for receiving a control message including an indication of the first time window, the second time window, or both.

In some examples of the method, apparatuses, and non-transitory computer-readable medium described herein, the first time window corresponds to a first value and the second time window corresponds to a second value, the first value being equal to or greater than the second value and the first value and the second value being less than a third value corresponding to a maximum duration for buffering TBs.

In some examples of the method, apparatuses, and non-transitory computer-readable medium described herein, the first time window, the second time window, or both, may be associated with a resource pool of a set of multiple resource pools, and the set of multiple resource pools may be associated with transmitting network coding messages, receiving the network coding messages, or both.

In some examples of the method, apparatuses, and non-transitory computer-readable medium described herein, the first set of TBs may be stored in the first buffer during the first time window irrespective of a decoding status of one or more TBs of the first set of TBs, the decoding status corresponding to decoding of the one or more TBs at one or more intended recipients of the one or more TBs.

Some examples of the method, apparatuses, and non-transitory computer-readable medium described herein may further include operations, features, means, or instructions for storing at least one TB of the second set of TBs in the second buffer based on a receive time of the at least one TB and a packet delay budget, the at least one monitoring criterion including the packet delay budget.

Some examples of the method, apparatuses, and non-transitory computer-readable medium described herein may further include operations, features, means, or instructions for storing at least one TB of the second set of TBs in the second buffer based on a location of a device associated with the at least one TB, the at least one monitoring criterion including the location.

Some examples of the method, apparatuses, and non-transitory computer-readable medium described herein may further include operations, features, means, or instructions for storing at least one TB of the second set of TBs in the second buffer based on a device identifier (ID) associated with the at least one TB, the at least one monitoring criterion including the device ID.

Some examples of the method, apparatuses, and non-transitory computer-readable medium described herein may further include operations, features, means, or instructions for receiving a message instructing the network node to refrain from using TBs of a first TB type for decoding network coding messages and storing at least one TB of the second set of TBs in the second buffer based on the at least one TB being of a type different from the first TB type, the at least one monitoring criterion including the first TB type.

Some examples of the method, apparatuses, and non-transitory computer-readable medium described herein may further include operations, features, means, or instructions for monitoring for network coding messages, where receiving the first set of one or more network coding messages over the wireless channel may be based on the monitoring.

Some examples of the method, apparatuses, and non-transitory computer-readable medium described herein may further include operations, features, means, or instructions for decoding a network coding message of the first set of one or more network coding messages to obtain at least one TB of the network coding message and storing the at least one TB of the network coding message in the second buffer based on the decoding.

Some examples of the method, apparatuses, and non-transitory computer-readable medium described herein may further include operations, features, means, or instructions for updating the second buffer by erasing at least one TB of the second set of TBs based on the first set of one or more network coding messages including a network coding message that includes the at least one TB.

Some examples of the method, apparatuses, and non-transitory computer-readable medium described herein may further include operations, features, means, or instructions for updating the second buffer by erasing at least one TB of the second set of TBs based on the first set of one or more network coding messages including a feedback collection message that includes the at least one TB.

Some examples of the method, apparatuses, and non-transitory computer-readable medium described herein may further include operations, features, means, or instructions for receiving an acknowledgment (ACK) message transmitted to a device capable of performing network coding and updated the second buffer based on receiving the ACK message.

In some examples of the method, apparatuses, and non-transitory computer-readable medium described herein, updating the second buffer may include operations, features, means, or instructions for erasing at least one TB of the second set of TBs based on determining that the ACK message corresponds to the at least one TB.

Some examples of the method, apparatuses, and non-transitory computer-readable medium described herein may further include operations, features, means, or instructions for receiving a number of ACK messages transmitted to one or more devices capable of performing network coding, where the portion of the second set of TBs may be further selected based on the number of ACK messages.

In some examples of the method, apparatuses, and non-transitory computer-readable medium described herein, the portion of the second set of TBs corresponds to a first value based on the number of ACK messages being greater than a threshold and the portion of the second set of TBs corresponds to a second value based on the number of ACK messages being less than the threshold, the first value being less than the second value.

Some examples of the method, apparatuses, and non-transitory computer-readable medium described herein may further include operations, features, means, or instructions for receiving a first message including a request for the network node to transmit a network coding message and transmitting a second message accepting the request or refraining from transmitting the second message based on a difference between a number of devices capable of performing network coding and a threshold.

Some examples of the method, apparatuses, and non-transitory computer-readable medium described herein may further include operations, features, means, or instructions for transmitting the second message based on the number of devices capable of performing the network coding being less than the threshold.

Some examples of the method, apparatuses, and non-transitory computer-readable medium described herein may further include operations, features, means, or instructions for receiving a message including an indication of the threshold, the message being a control message or a broadcast message.

In some examples of the method, apparatuses, and non-transitory computer-readable medium described herein, transmitting the second set of one or more network coding messages may include operations, features, means, or instructions for transmitting the second set of one or more network coding messages using a set of one or more dedicated resources for transmitting network coding messages.

Some examples of the method, apparatuses, and non-transitory computer-readable medium described herein may further include operations, features, means, or instructions for receiving a control message including an indication of the set of one or more dedicated resources, where transmitting the second set of one or more network coding messages may be based on the indication.

Some examples of the method, apparatuses, and non-transitory computer-readable medium described herein may further include operations, features, means, or instructions for transmitting a sidelink control message to reserve one or more resources for performing sidelink communications, where the set of one or more dedicated resources includes the one or more resources.

DETAILED DESCRIPTION

Figure 1:
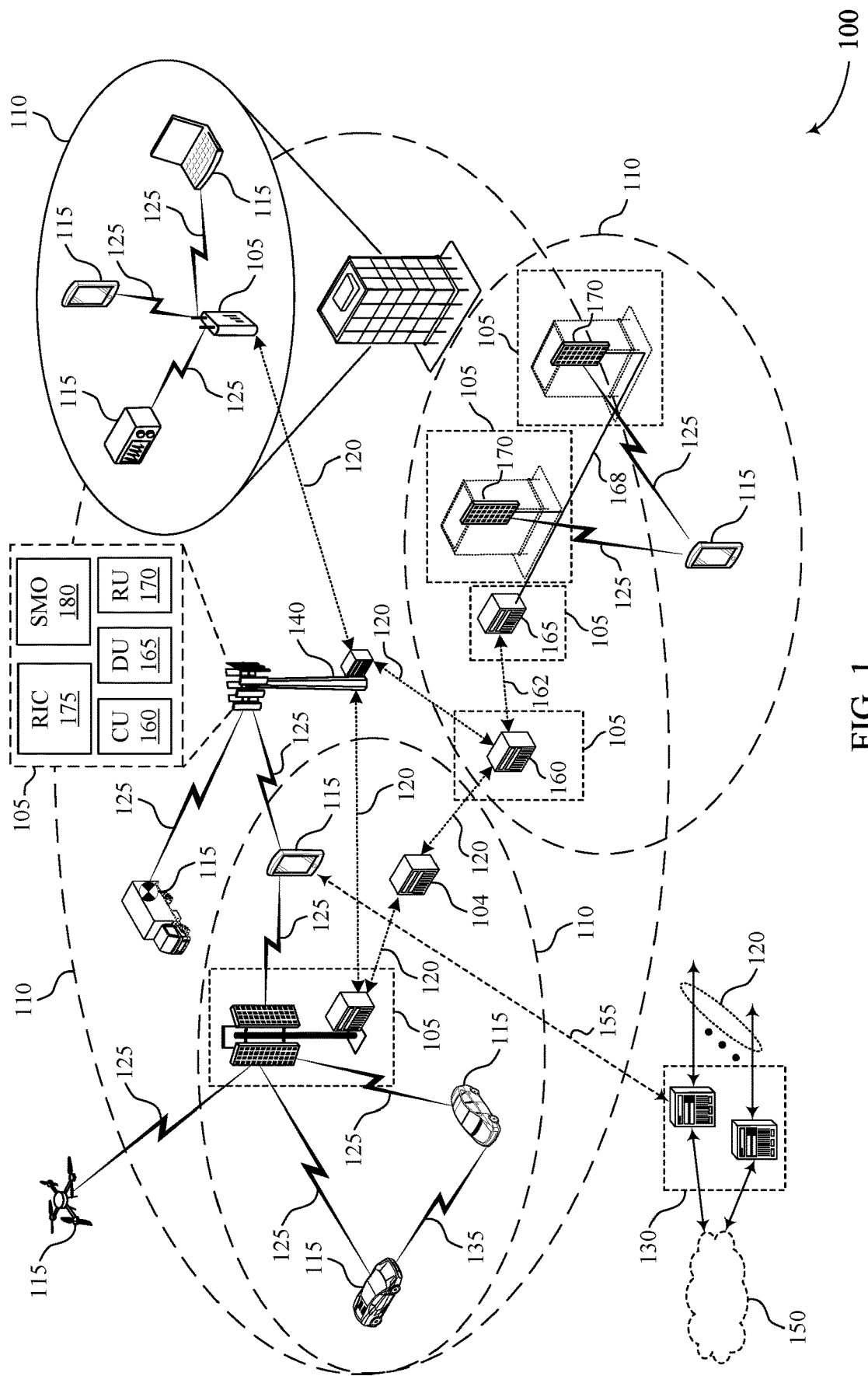
FIGS. 1 and 2 each illustrate an example of a wireless communications system that supports a distributed multi-encoder network coding design in accordance with one or more aspects of the present disclosure.

Some wireless communications systems may support network coding techniques for improving system capacity and resource utilization within the wireless communications systems. For example, a wireless communications system may employ one or more communication devices, such as network entities associated with roadside units (RSUs), to retransmit certain transport blocks (TBs) within the wireless communications system using network coding. Such communication devices (e.g., network entities) may be referred to throughout the present disclosure as network coding encoders or network encoders. In some examples, a network encoder may collectively retransmit TBs from multiple communication devices via a single network coding message, thereby reducing retransmissions in the wireless communications system while maintaining performance.

In some examples, as the number (e.g., density) of communication devices (e.g., user equipments (UEs)) within a geographic coverage area increases, the network traffic (e.g., user traffic) may also increase. Additionally, or alternatively, some network encoders may operate in a half-duplex mode, such that the network encoders may not be capable of transmitting and receiving communications simultaneously. As such, if a UE transmits a message requesting for retransmission of one or more TBs (e.g., included in the message) by a network encoder while the network encoder is transmitting a network coding message, the network encoder may fail to receive (e.g., may miss) the request. As a result, the TBs included in the message may not be retransmitted. Therefore, to support increased user traffic (e.g., due to an increase in number of UEs) and reduce the likelihood of network encoders failing to receive retransmission requests (e.g., due to half-duplex operations) the network may employ multiple network encoders to perform the network coding. However, in some examples, network coding may not be coordinated between the multiple network encoders employed to perform the network encoding. As such, different network encoders may attempt to retransmit a same TB, thereby increasing the number of retransmissions unnecessarily and reducing the efficiency of resource utilization within the wireless communications systems.

Various aspects of the present disclosure generally relate to techniques for a distributed multi-encoder network coding design, and more specifically, to designs for increasing network coding and signaling efficiency in a wireless communications system with multiple network encoders. For example, a network encoder may be configured with multiple buffers for performing network coding. In some examples, the network encoder may include a first buffer for storing TBs to be used by the network encoder for decoding network coding messages transmitted by UEs or other network encoders. Additionally, or alternatively, the network encoder may include a second buffer for storing TBs to be included in one or more network coding messages transmitted by the network encoder (e.g., retransmitted by the network encoder in a network coding message). In some examples, the first buffer and the second buffer may each store TBs for a duration of time that may be determined (e.g., fixed, preconfigured, configured) at the network encoder or indicated to the network encoder by the network.

In some examples, the network encoder may select TBs to store in the first buffer (e.g., for decoding network coding messages) and the second buffer (e.g., for retransmission in a network coding message) based on one or more sets of criteria. Additionally, or alternatively, the network encoder may select TBs stored in the second buffer for retransmission (e.g., in a network coding message) based on other criteria (e.g., monitoring criteria). In some examples, by applying criteria to the first buffer and the second buffer, the network encoder may determine (e.g., monitor) whether TBs stored at the network encoder are (e.g., are currently or have previously been) network coded and retransmitted by other network encoders. As such, the network encoder may avoid retransmitting (e.g., encoding in network coding messages) TBs retransmitted by other network encoders. Additionally, or alternatively, the network encoder may avoid retransmitting TBs which have been successfully decoded by one or more destination UEs (e.g., intended receivers of the TBs). As such, the network encoder may reduce retransmissions and increase resource utilization within the wireless communications system.

Particular aspects of the subject matter described herein may be implemented to realize one or more of the following potential advantages. The techniques employed by the described communication devices may provide benefits and enhancements to the operation of the communication devices, including enabling a design for increasing network coding and signaling efficiency within a wireless communications system (e.g., including multiple network encoders). For example, operations performed by the described communication devices may provide improvements to system capacity and resource utilization within the wireless communications system. In some implementations, the operations performed by the described communication devices to improve system capacity and resource utilization within the wireless communications system include configuring a network encoder with multiple buffers for performing network coding. In some other implementations, operations performed by the described communication devices may also support reduced power consumption, increased throughput, and higher data rates, among other benefits.

Aspects of the disclosure are initially described in the context of wireless communications systems. Aspects of the disclosure are further illustrated by and described with reference to a process flow, apparatus diagrams, system diagrams, and flowcharts that relate to a distributed multi-encoder network coding design.

FIG. 1 illustrates an example of a wireless communications system 100 that supports a distributed multi-encoder network coding design in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., TAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the TAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support a distributed multi-encoder network coding design as described herein. For example, some operations described as being performed by a UE 115 or a network entity 105 (e.g., a base station 140) may additionally, or alternatively, be performed by one or more components of the disaggregated RAN architecture (e.g., TAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units (RSUs), or with the network via one or more network nodes (e.g., network entities 105, base stations 140, RUs 170) using vehicle-to-network (V2N) communications, or with both. In some examples, an RSU may be a network entity 105 of the wireless communications system 100 or otherwise associate with a network entity 105 of the wireless communications system 100.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers)

compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The wireless communications system 100 may support a design for increasing network coding and signaling efficiency in the wireless communications system 100. For example, a network node (e.g., a network entity 105, an RSU, a base station component, a UE 115, or one or more other communication devices operating within the wireless communications system 100) may store a first set of TBs in a first buffer. The first set of TBs may be received at the network node over a wireless channel during a first time window. The network node may store a second set of TBs in a second buffer. The second set of TBs may be received at the network node over the wireless channel during a second time window and according to at least one monitoring criterion. The network node may receive a first set of one or more network coding messages over the wireless channel. As part of receiving the first set of one or more network coding messages, the network node may decode the first set of one or more network coding messages based on the first set of TBs in the first buffer. The network node may transmit a second set of one or more network coding messages that may correspond to a portion of the second set of TBs in the second buffer. The portion may be selected from the second set of TBs based on the first set of one or more network coding messages. As a result, the network node may increase system capacity and resource utilization within a wireless communications system, among other benefits.

Figure 2:
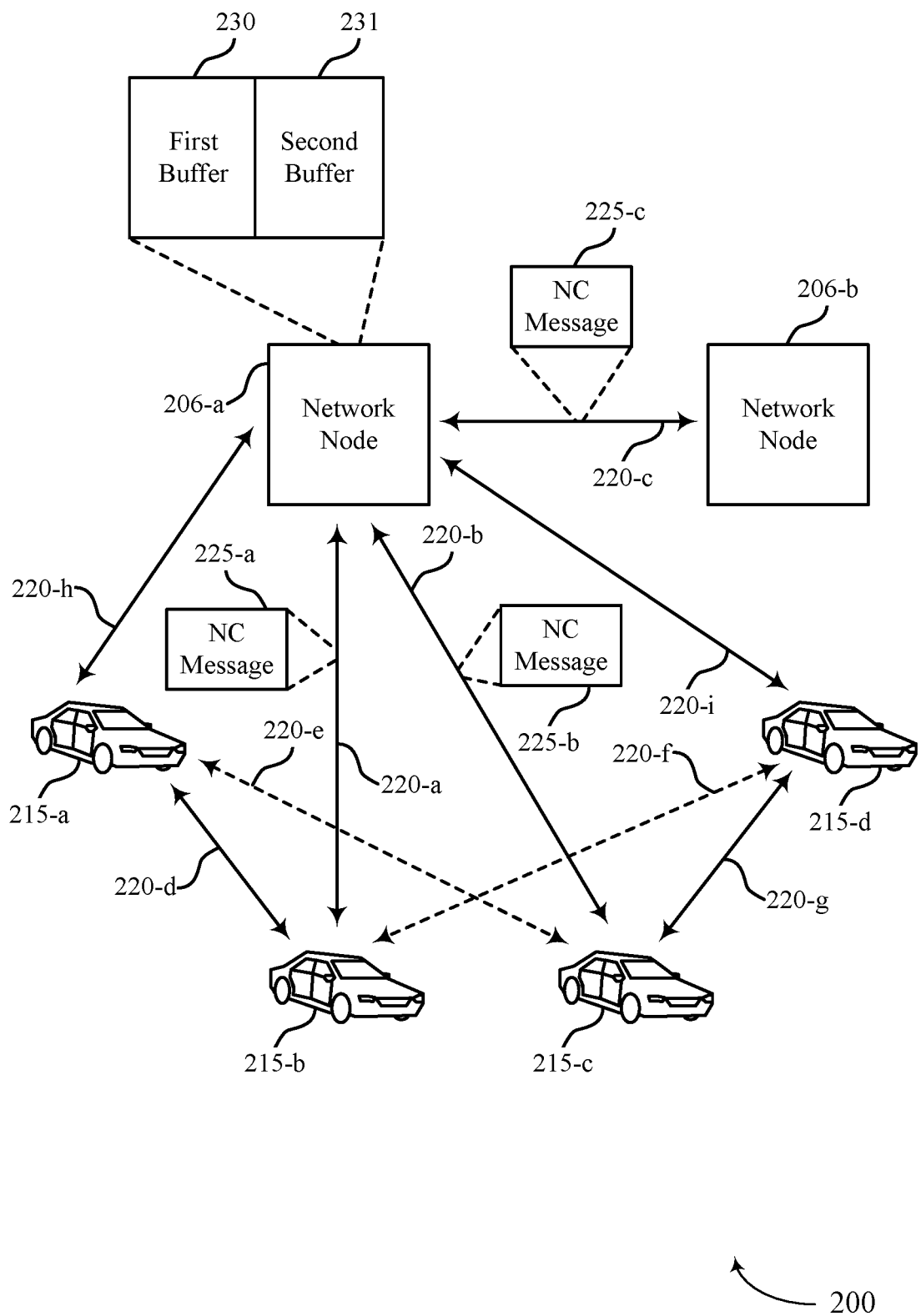

FIG. 2 illustrates an example of a wireless communications system 200 that supports a distributed multi-encoder network coding design in accordance with one or more aspects of the present disclosure. In some examples, the wireless communications system 200 may implement aspects of the wireless communications system 100. For example, the wireless communications system 200 may include one or more network nodes 206 (e.g., a network node 206-*a* and a network node 206-*b*) and one or more UEs 215 (e.g., a UE 215-*a*, a UE 215-*b*, a UE 215-*c* and a UE 215-*d*), which may be examples of the corresponding devices as described with reference to FIG. 1. For example, the network node 206-*a* and the network node 206-*b* may be examples of a network entity 105 (e.g., any network entity described herein) or a UE 115 (e.g., any UE described herein) as described with reference to FIG. 1. In the example of FIG. 2, the wireless communications system 200 may be a V2X system, in which the UEs 215 and the network nodes 206 may each be an example of an RSU, a relay node, a UE (e.g., a vehicle), or one or more other network nodes (e.g., a base station, a CU, a DU, or an RU) as described with respected to FIG. 1. For example, the network node 206-*a* and the network node 206-*b* may each be an example of a network encoder.

The wireless communications system 200 may support sidelink communications between the UEs 215 via one or more sidelink channels 220. For example, a UE 215-*a* may transmit a first message (e.g., a first packet, not shown) including a first TB (e.g., represented as $Tx_a$) to a UE 215-*b* via a sidelink channel 220-*d* and to a UE 215-*c* via a sidelink channel 220-*e*. Additionally, or alternatively, a UE 215-*d* may transmit a second message (e.g., a second packet, not shown) including a second TB (e.g., represented as $Tx_b$) to the UE 215-b via a sidelink channel 220-f and to the UE 215-c via a sidelink channel 220-g. In the example of FIG. 2, the UE 215-a and the UE 215-d may each be an example of a source UE (e.g., a transmitting UE) and the UE 215-b and the UE 215-c may each be an example of a destination UE (e.g., an intended receiver of messages transmitted from the source UE).

In some examples, the UE 215-b or the UE 215-c (e.g., one or more destination UEs) may fail to receive (or fail to successfully decode) a message from the UE 215-a or the UE 215-d (e.g., a source UE). In such examples, one or both of the sources UEs may be triggered to retransmit the message (e.g., or one or more TBs of the message). For example, the UE 215-c may fail to receive (or fail to successfully decode) the first message (e.g., including the first TB) transmitting by the UE 215-a via the sidelink channel 220-e. As such, the UE 215-c may transmit a negative acknowledgment (NACK) message (not shown) to the UE 215-a via the sidelink channel 220-e. In response, the UE 215-a may be triggered to retransmit the first TB (e.g., included in the first message). Additionally, or alternatively, the UE 215-b may fail to receive (or fail to successfully decode) the second message (e.g., including the second TB) transmitting by the UE 215-d via the sidelink channel 220-f. As such, the UE 215-b may transmit a NACK message (not shown) to the UE 215-d via the sidelink channel 220-f. In response, the UE 215-d may be triggered to retransmit the second TB (e.g., included in the second message).

In some examples, as the number of UEs 215 retransmitting messages (e.g., packets including TBs) increases, the overhead associated with retransmissions in the wireless communications system 200 may also increase. Therefore, to reduce the overhead associated with retransmissions, the wireless communications system 200 may include one or more network nodes 206 (e.g., one or more network encoders) that may aggregate messages (e.g., TBs of the packets) from multiple UEs 215 in a single retransmission. That is, after an initial (e.g., current, previous) transmission of a message by the UE 215-a or the UE 215-d (e.g., the source UE), retransmissions of the message (e.g., TBs of the packets) may be performed (e.g., replaced) by one or more network nodes 206 (e.g., one or more network encoders). For example, in the wireless communications system 200, network coding may be used to increase system capacity and improve resource utilization. In some examples, increased system capacity and improvements to resource utilization may be achieved by reducing retransmissions (e.g., through network coding), while maintaining performance. As such, the wireless communications system 200 may support an increased number of UEs 215 or an increased amount of traffic per UE 215 operating within the wireless communications system 200.

For example, in response to receiving a NACK message from the UE 215-c, the UE 215-a may transmit (e.g., via a sidelink channel 220-h) a first request (not shown) for the network node 206-a to retransmit the first TB. Additionally, or alternatively, in response to receiving the NACK message from the UE 215-b, the UE 215-d may transmit (e.g., via a sidelink channel 220-i) a second request (not shown) for the network node 206-a to retransmit the second TB. In response to receiving the first request and the second request, the network node 206-a may, in some examples, proceed to retransmit the first TB and the second TB. For example, the network node 206-a may transmit a network coding (NC) message (e.g., a NC message 225-a) to the UE 215-b via a sidelink channel 220-a and a NC message 225-b to the UE 215-c via a sidelink channel 220-b. In some examples, the NC message 225-a and the NC message 225-b may each include the first TB (e.g., represented as $Tx_a$) and the second TB (e.g., represented as $Tx_b$). For example, the first TB of the NC message 225-a and the second TB of the NC message 225-b may be aggregated into a single retransmission (e.g., a single network coding message) that may be represented as a function of the first TB and the second TB according to Equation 1:

$$f(Tx_a, Tx_b). \qquad (1)$$

In some examples, by aggregating TBs of messages from multiple UEs 215 in a single retransmission, the network node 206-a may increase resource utilization within the wireless communications system 200.

In some examples of network coding, an error may occur resulting in an erasure of one or more elements of a network coding message. However, in such examples, the UE 215-b and the UE 215-c (e.g., the destination UEs) may employ single parity check codes to correct for the erasure. For example, an input vector (e.g., represented as [a, b, c]), may be encoded to an encoding vector (e.g., represented as [a, b, c, a⊕b⊕c]) and transmitted (e.g., in a network coding message). In such an example, a single erasure of an element of the encoding vector (e.g., a, b, or c) may be recovered. That is, if an element is erased (e.g., missing) from a received vector (e.g., represented as [a, 0, c, a⊕b⊕c]), the erased element (e.g., b) may be recovered (e.g., by the destination UE), for example by summing the others elements (e.g., of the received vector). In some examples, the UE 215-b and the UE 215-c (e.g., the destination UEs) may obtain the erased element (e.g., b) by summing the other elements of the received vector according to Equation 2:

$$a \oplus c \oplus (a \oplus b \oplus c) = b. \qquad (2)$$

In some examples, a solution, such as represented by Equation 2, may be viewed as a linear system (e.g., over a Galois field) with three variables and four linearly independent constraints. For example, such a linear system may be represented according to Equation 3:

$$\begin{bmatrix} 1 & 0 & 0 \\ 0 & 1 & 0 \\ 0 & 0 & 1 \\ 1 & 1 & 1 \end{bmatrix} \cdot [a \ b \ c]^T = [a \ b \ c \ a \oplus b \oplus c]^T \qquad (3)$$

where any three constraints (e.g., corresponding to a single erasure) may be suitable (e.g., sufficient) for obtaining (e.g., recovering) each variable of the input vector (e.g., a, b, and c). Therefore, in some examples, single parity check codes may increase the reliability of network coding in the wireless communications system 200.

In some examples, as the number of UEs 215 within the wireless communications system 200 increases, the network traffic may also increase. As such, the network may employ multiple network nodes 206 (e.g., multiple network encoders) to perform the network coding. That is, rather than relying on a single network node 206 (e.g., a central network encoder), such as the network node 206-a or the network node 206-b, the wireless communications system 200 may include multiple network nodes 206 (e.g., multiple RSUs, multiple other communication devices, or a combination of RSUs and other communication devices), in an area (e.g., a dense traffic area). For example, the wireless communications system 200 may employ the network node 206-*a* and the network node 206-*b* to perform the network coding. In some examples, however, the network node 206-*a* and the network node 206-*b* may operate in a half-duplex mode, such that the network node 206-*a* and the network node 206-*b* may not be capable of transmitting and receiving communications simultaneously.

For example, if the UE 215-*a* transmits a message (not shown) to the network node 206-*a* requesting retransmission of one or more TBs (e.g., included in the message) while the network node 206-*a* is transmitting a network coding message (e.g., the NC message 225-*a*), the network node 206-*a* (e.g., the network encoder) may not receive the message and the TBs included in the message may not be retransmitted. That is, if a single network encoder is performing the network coding and the network encoder is operating in half-duplex, the network encoder may fail to receive (e.g., miss a relatively large portion of) messages (e.g., packets including TBs) to be retransmitted, for example due to the half-duplex operation. For example, in a distributed network scenario, a single TB may not be assigned to a single network encoder. As such, the single TB may be unnecessary retransmitted (e.g., taken over) by multiple network encoders, which may increase the number of network resources being used for retransmissions. That is, in some examples, retransmission of a single TB by multiple network encoders may result in network resources being used unnecessarily (e.g., wasted). For example, network coding between the network node 206-*a* and the network node 206-*b* may not be coordinated. As such, the network node 206-*a* and the network node 206-*b* may both attempt to retransmit a same TB. For example, the network node 206-*b* may attempt to retransmit a network coding message (not shown) that may include one or both of the first TB and the second TB retransmitted in the NC messages 225. As a result, the efficiency of resource utilization within the wireless communications system 200 may be reduced.

In some examples, a distributed multi-encoder network coding design, as described herein, may increase network coding and signaling efficiency within the wireless communications system 200 (e.g., a wireless communications system including multiple network encoders). For example, the network node 206-*a* (e.g., a network encoder), may be configured with multiple buffers (e.g., a first buffers 230 and a second buffer 231) for performing network coding. The first buffer 230 may be used by the network node 206-*a* for storing TBs to be used for decoding network coding messages transmitted from other network nodes 206 (e.g., other network encoders), such as an NC message 225-*c* transmitted from the network node 206-*b* (e.g., via a sidelink channel 220-*c*). Additionally, or alternatively, the second buffer 231 may be used for storing TBs to be included in network coding messages to be transmitted by the network node 206-*a*, such as the NC message 225-*a* and the NC message 225-*b*.

For example, as illustrated in the example of FIG. 2, the network node 206-*a* may store a first set of TBs in the first buffer 230. The first set of TBs may be received at the network node 206-*a* over a wireless channel during a first time window. The network node 206-*a* may store a second set of TBs in the second buffer 231. The second set of TBs may be received at the network node over the wireless channel during a second time window and according to at least one monitoring criterion. In some examples, the network node 206-*a* may receive a first set of one or more network coding messages over the wireless channel. For example, the network node 206-*a* may receive the NC message 225-*c* from the network node 206-*b* over the sidelink channel 220-*c*. In some examples, as part of receiving the NC message 225-*c*, the network node 206-*a* may decode the NC message 225-*c* based on the first set of TBs stored in the first buffer 230. Additionally, or alternatively, the network node 206-*a* may transmit a second set of one or more network coding messages that may correspond to a portion of the second set of TBs in the second buffer 231. For example, the network node 206-*a* may transmit the NC message 225-*a* and the NC message 225-*b* that may include the portion of TBs stored in the second buffer 231. In some examples, the network node 206-*a* may select TBs from the second set of TBs (e.g., for retransmission in the NC messages 225) based on the NC message 225-*c*. As a result, the network node 206-*a* may increase system capacity, reduce signaling exchanged between encoders (e.g., the network node 206-*a* and the network node 206-*b*), and improve resource utilization within a wireless communications system, among other benefits.

Figure 3:
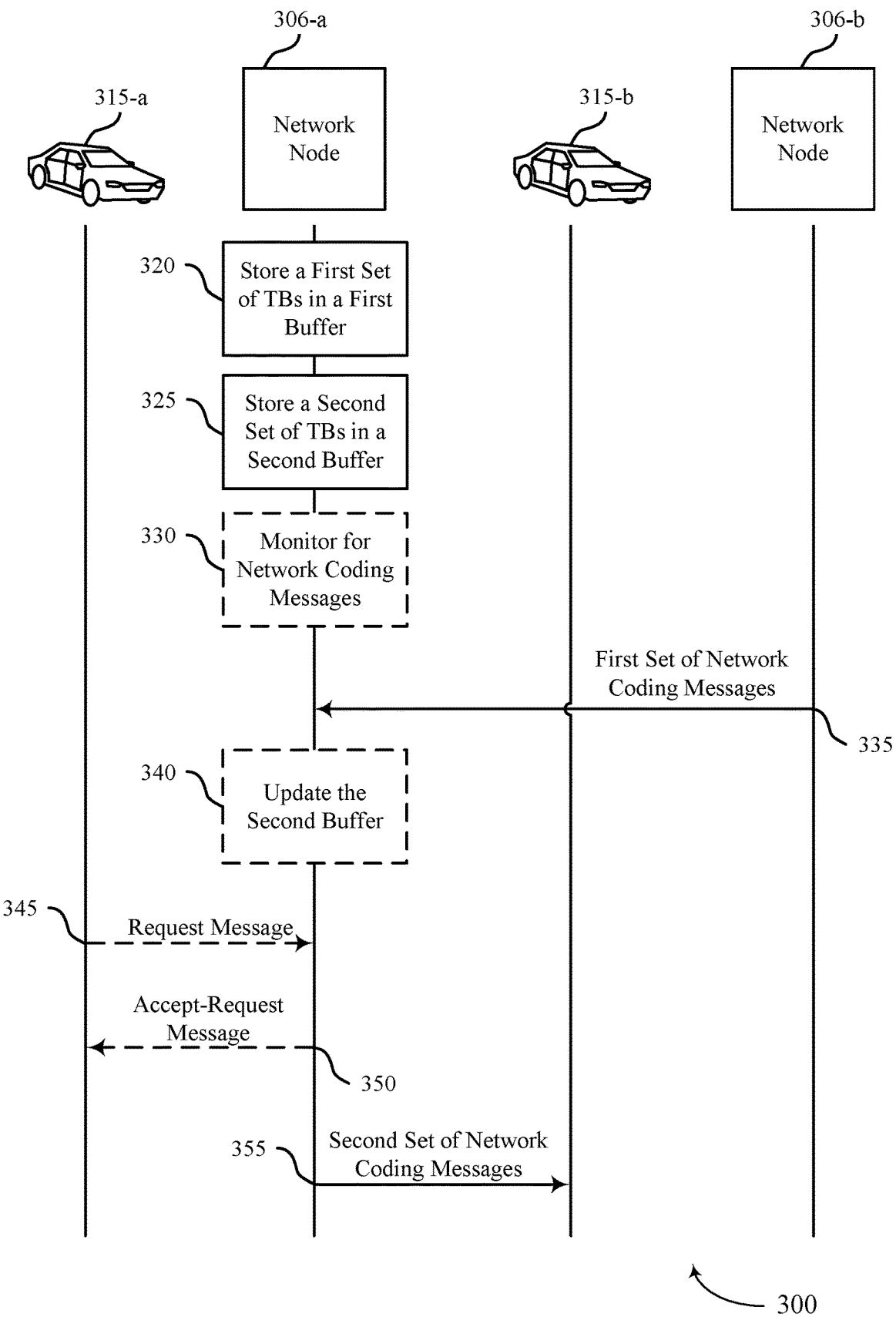
FIG. 3 illustrates an example of a process flow that supports a distributed multi-encoder network coding design in accordance with one or more aspects of the present disclosure.

FIG. 3 illustrates an example of a process flow 300 that supports a distributed multi-encoder network coding design in accordance with one or more aspects of the present disclosure. In some examples, the process flow 300 may implement or be implemented by aspects of the wireless communications system 100 and the wireless communications system 200. For example, the process flow 300 may include example operations associated with a UE 315-*a*, a UE 315-*b*, a network node 306-*a*, and a network node 306-*b*, which may be examples of the corresponding devices as described with reference to FIGS. 1 and 2. For example, the network node 306-*a* and the network node 306-*b* may be examples of a network entity 105 (e.g., any network entity described herein) or a UE 115 (e.g., any UE described herein) as described with reference to FIG. 1. The operations performed by the UE 315-*a*, the UE 315-*b*, the network node 306-*a*, and the network node 306-*b* may support improvements to communications between one or both of the UEs 315 and one or both of the network nodes 306, among other benefits. In the following description of the process flow 300, operations between the UE 315-*a*, the UE 315-*b*, the network node 306-*a*, and the network node 306-*b* may occur in a different order or at different times than as shown. Some operations may also be omitted from the process flow 300, and other operations may be added to the process flow 300.

In some examples, the UEs 315 and the network nodes 306 may each be capable of supporting network coding in accordance with the distributed multi-encoder network coding design, as described herein. For example, the UEs 315 and the network nodes 306 each be an example of an RSU, a relay node, a UE (e.g., a vehicle), or one or more other network nodes (e.g., a network entity, a base station, a CU, a DU, or an RU) as described throughout the present disclosure, including with respected to FIG. 1. For example, the UE 315-*a* may be an example of a source UE and the UE 315-*b* may be an example of a destination UE. Additionally, or alternatively, the network nodes 306 may each be an example of a network encoder. The UEs 315 and the network nodes 306 may each support sidelink communications, for example in a V2X system.

In some examples, the network nodes 306 (e.g., the network encoders) may each maintain two buffers of TBs; a first buffer for decoding network coding messages (e.g., network coding packets) and a second buffer for selecting the TBs for a network coding message (e.g., a network coding packet, a next network coding packet) to be transmitted by the network nodes 306. For example, at 320, the network node 306-*a* may store a first set of TBs in the first buffer. The first set of TBs may be received at the network node 306-*a* over a wireless channel (e.g., a sidelink channel) during a first time window. In some examples, the network node 306-*a* may store TBs in the first buffer based on a first set of criteria (e.g., one criterion or multiple criteria). The first set of criteria (e.g., for determining whether a TB may be stored in the first buffer) may be common to (e.g., the same for) multiple network nodes 306 (e.g., multiple network encoders) operating within the wireless communications system, such as the network node 306-*a* and the network node 306-*b*.

For example, the network node 306-*a* may store, in the first buffer, any TB received (or decoded) within the first time window, including TBs directly transmitted between the UEs 315, retransmission requests transmitted by the UEs 315 to the network nodes 306 to request retransmission of TBs for which direct transmissions by the UEs 315 have failed, and network coded retransmissions sent by the network node 306-*b*. In some examples, the duration of the first time window may be determined (e.g., fixed, preconfigured, configured) at the network node 306-*a*. In some examples, the duration of the first time window may be determined (e.g., fixed, preconfigured, configured) for a particular resource pool (e.g., sidelink resource pool for transmitting or receiving network coding messages). Additionally, or alternatively, the duration of the first time window may be signaled (e.g., dynamically or semi-statically) to the network node 306-*a*, for example from one or more other network nodes (e.g., a base station, a CU, a DU, or an RU). In some examples, the duration of the first time window may be confined (e.g., subject) to a particular value (e.g., a maximum value or an otherwise suitable value). In some examples, the network node 306-*a* may store a TB in the first buffer (e.g., during the first time window) irrespective of a decoding status of the TB. In some examples, the decoding status may correspond to decoding of the TB at one or more intended recipients (e.g., destination UEs) of the TB. For example, while the network node 306-*a* may determine (e.g., from available information) that the TB has been received (and successfully decoded) by the UE 315-*b* (e.g., one or more destination UEs, some or all intended recipients of the transmitted TB), the network node 306-*a* may buffer the TB (e.g., store the TB in the first buffer) for decoding network coding messages (e.g., network coding packets) from other encoders (e.g., the network node 306-*b*).

At 325, the network node 306-*a* may store a second set of TBs in a second buffer. The second set of TBs may correspond to what has been selected for retransmission and network coding by the network node 306-*a*, and the contents of the second buffer may be updated based on the transmissions and retransmissions of TBs that the network node 306-*a* observes from the UEs 315 and the network node 306-*b*.

In some examples, the second set of TBs may be received at the network node 306-*a* over the wireless channel (e.g., the sidelink channel) during a second time window. In some examples, the network node 306-*a* may store TBs in the second buffer based on a second set of criteria (e.g., one criterion or multiple criteria). The second set of criteria (e.g., for determining whether a TB may be stored in the second buffer) may be common to (e.g., the same for) the network node 306-*a* or the network node 306-*b* (e.g., a network encoder) and one or more other communication device (e.g., one or more UEs 315) associated with the network node 306-*a* or the network node 306-*b*.

For example, the network node 306-*a* may store, in the second buffer, any TB received (and successfully decoded) within the second time window. In some examples, the duration of the second time window may be determined (e.g., fixed, preconfigured, configured) at the network node 306-*a*. For example, the duration of the second time window may be determined (e.g., fixed, preconfigured, configured) at the network node 306-*a* for a particular resource pool (e.g., sidelink channel resource pool for transmitting or receiving network coding messages). Additionally, or alternatively, the duration of the second time window may be signaled (e.g., dynamically or semi-statically) to the network node 306-*a*, for example from one or more other network nodes (e.g., the network entity, the base station, the CU, the DU, or the RU). In some examples, the duration of the second time window may be confined (e.g., subject to) a particular value (e.g., a maximum value or an otherwise suitable value).

Additionally alternatively, the network node 306-*a* may store, in the second buffer, any TB that has not expired (e.g., as determined based on a packet delay budget (PDB) of the TB). For example, the network node 306-*a* may store a TB in the second buffer based on a receive time of the TB and the PDB of the TB. In some examples, the PDB of a TB may be a one-way PDB that corresponds to a threshold for a duration in which the TB (e.g., a packet including the TB) may be delayed in a wireless communications system. Additionally, or alternatively, the network node 306-*a* may store, in the second buffer, any TB transmitted or received by a communication device (e.g., one or more UEs 315 or other communication devices) within a geographical area (e.g., a particular location), or zone, or belonging to (e.g., associated with) a group of communication devices (e.g., including the network node 306-*a*). In some examples, the group of communication devices may include a subset of the communication devices operating within the network, such as a platoon of autonomous vehicles. In some examples, the group of communication devices may be based on (e.g., determined by, identified by) a group identifier (ID) or destination ID (e.g., an ID associated with one or more destination UEs).

In some examples, the network node 306-*a* may store a TB in the second buffer based on a TB type. For example, the network node 306-*b* (or one or more other network nodes 306, not shown) may signal a type of TB that may not be used for network coding. That is, the network node 306-*a* may receive (e.g., from the network node 306-*b*) a message instructing the network node 306-*a* to refrain from using TBs of a particular type (e.g., a TB type) for decoding network coding messages. In some examples, the network node 306-*a* may determine whether to store a TB in the second buffer based on a combination of the aforementioned criteria (e.g., the PDB of the TB and the time in which the TB is received at the network encoder, the location of the source UE or the destination UE associated with the TB, a device ID associated with the TB, a group ID associated with the TB, or one or more other criteria), which may be referred to as monitoring criteria. For example, one or more combinations of the aforementioned monitoring criteria (or other monitoring criteria) may be specified (e.g., preconfigured or configured) at the network node 306-*a*. Additionally, or alternatively, one or more combinations of monitoring criteria may be signaled (e.g., dynamically or semi-statically) to the network node 306-*a*, for example from one or more other network nodes (e.g., a network entity, a base station, a CU, a DU, or an RU).

In some examples, at 330, the network node 306-*a* may monitor for network coding messages. At 335, and based on monitoring for network coding messages at 330, the network node 306-*a* may receive a first set of one or more network coding messages over the wireless channel (e.g., the sidelink channel) from the network node 306-b. As part of receiving the first set of one or more network coding messages, the network node 306-a may decode the first set of one or more network coding messages based on the first set of TBs stored in the first buffer at 320. That is, the network node 306-a may use one or more TBs stored in the first buffer at 320 for decoding network coding messages from other network nodes 306 (e.g., other network encoders), such as the network node 306-b.

In some examples, the network node 306-a may update the second buffer based on the first set of one or more network coding messages received at 335. For example, at 340, the network node may update the second buffer by erasing at least one TB of the second set of TBs. In some examples, the network node 306-a may erase the at least one TB based on a network coding message of the first set of one or more network coding messages (e.g., received at 335) including the at least one TB. That is, the network node 306-a may determine that a TB included in a network coding message of the first set of network coding messages received at 335 corresponds to a TB stored in the second buffer and, as a result, the network node 306-a may erase the TB from the second buffer.

In some examples, at 345, the network node 306-a may receive a request message from the UE 315-a (e.g., a source UE). The request message may include a request for the network node 306-a to retransmit a TB in a network coding message. For example, the UE 315-a may receive an indication (e.g., a NACK message) that a message (e.g., a packet including one or more TBs) transmitted by the UE 315-a to the UE 315-b (e.g., a destination UE) failed to be received (and successfully decoded) by the UE 315-b. As a result of receiving the NACK message, the UE 315-a may be triggered to transmit a retransmission request (e.g., via the request message) to the network node 306-a. In some examples, the UE 315-a may be configured (e.g., triggered) to transmit the retransmission request after a first (e.g., initial) transmission fails or after one or more retransmissions fail (e.g., to be received and successfully decoded by one or more of the destination UEs).

In some examples, the UE 315-a may request for the network node 306-a to transmit a network coding message (e.g., to retransmit one or more TBs) via a request flag in the request message. For example, the UE 315-a may transmits the request message (e.g., including the TB to be retransmitted via the network coding message) with a network coding request flag. In some examples, in response to receiving the request message, the network node 306-a may accept the request. For example, at 350, the network node 306-a may transmit an accept-request message indicating that the network node 306-a accepts the request to retransmit the TB as part of a network coding message (e.g., a network coding transmission). In some examples, the network node 306-a may determine to retransmit (e.g., or store in the second buffer) TBs included in a retransmission request message (e.g., the request message transmitted at 345), but may refrain from transmitting a message indicating that the request has been accepted (e.g., the accept-request message transmitted at 350). For example, to reduce the number of transmissions (e.g., retransmission) communicated within the wireless communications system, the network node 306-a may refrain from transmitting messages indicating that a retransmission request has been accepted (e.g., accept-request messages) unnecessarily. In some examples, the network node 306-a may refrain from transmitting accept-request messages if the number of network nodes 306 (e.g., network encoders) operating within the wireless communications system satisfy a threshold.

At 355, the network node 306-a may transmit (e.g., to the UE 315-b or one or more other UEs 315 (not shown)) a second set of one or more network coding messages that may correspond to (e.g., include) a portion of the second set of TBs stored in the second buffer (e.g., the updated second buffer). For example, the second set of network coding messages may include one or more TBs that the UE 315-a requested be retransmitted (e.g., in the request message transmitted at 345). In some examples, the portion of TBs included in the second set of network coding messages may be selected from the second set of TBs based on the first set of one or more network coding messages. For example, one or more TBs to be retransmitted by the network node 306-a in a network coding message (e.g., TB candidates) may be stored in the second buffer and the network node 306-a may select a portion of the TB candidates for retransmission in a network coding message based on network coding messages received by the network node 306-a (e.g., from other network nodes 306).

In some examples, to determine whether TBs stored at the network node 306-a have been retransmitted (e.g., taken over) by one or more other network nodes 306 (e.g., one or more other network encoders), such as the network node 306-b or one or more other network nodes 306 (not shown), the network node 306-a may monitor for feedback messages (e.g., feedback collection packets, feedback collection messages) and network coding messages transmitted by the other network nodes 306. In some examples, such messages may include (e.g., contain) TBs the other network nodes 306 have determined to retransmit (e.g., have taken over). Additionally, or alternatively, such messages may indicate whether the other network nodes 306 are capable of successfully transmitting (e.g., retransmitted, delivering) the TBs to the corresponding UEs 315 (e.g., the destination UEs, the intended receivers of the transmitted TBs). Thus, by monitoring for feedback collection messages and network coding messages transmitted by other network nodes 306, the network node 306-a may determine whether particular TBs stored in the second buffer at the network node 306-a may be erased (e.g., give up). In some examples, the network node 306-a may use the first buffer when monitoring for feedback collection messages or network coding messages from the other network nodes 306. For example, if the network node 306-a receives a feedback collection message or network coding message, the network node 306-a may decode the feedback collection message or the network coding message using TBs stored in the first buffer.

Additionally, or alternatively, the network node 306-a may monitor for acknowledgment (e.g., ACK) and NACK messages (e.g., network coding ACK messages or network coding NACK messages) transmitted to other network nodes 306 (e.g., other network encoders), for example from the UE 315-b (e.g., the destination UE). In some examples, the ACK messages and the NACK messages may be configured (e.g., preconfigured) through one or more network nodes 306 (e.g., one or more network encoders), such that each network node 306 may decode (e.g., read) feedback messages (e.g., the ACK message and the NACK messages) transmitted to other network nodes 306 operating within the wireless communications system.

In some examples, the network node 306-a may select TB candidates (e.g., stored in the second buffer) based on messages (e.g., feedback collection messages and network coding messages) received from other network nodes 306 (e.g., other network encoders) and messages (e.g., ACK messages and NACK messages) received from one or more UEs 315 (e.g., one or more destination UEs). That is, candidate TBs may be selected based on (e.g., are subject to) a set of criteria. For example, the network node 306-*a* may select candidate TBs based on a portion of UEs 315 (e.g., the destination UEs, the intended recipients) transmitting NACK messages (e.g., indicating the portion destination UEs failed to receive or successfully decode one or more TBs) rather than ACK messages (e.g., indicating the portion of destination UE successfully decoded one or more TBs). For example, if a number of NACK messages transmitted by UEs 315 (e.g., or the number of UEs 315 transmitting NACK messages) satisfies a threshold (or is increased relative to the number of ACK messages) the network node 306-*a* may increase the number of TBs included in a network coding message. Additionally, or alternatively, if a number of ACK messages transmitted by UEs 315 (e.g., or the number of UEs 315 transmitting ACK messages) satisfies a threshold (or is increased relative to the number of NACK messages) the network node 306-*a* may decrease the number of TBs included in a network coding message.

Additionally, or alternatively, if the network node 306-*a* receives a message (e.g., a feedback collection message or a network coding message) received from another network node 306 or a message (e.g., an ACK message or a NACK message) from a UE 315 that corresponding to (e.g., includes) a TB stored in the second buffer of the network node 306-*a*, the network node 306-*a* may determine to remove (e.g., erase) the TB from the second buffer. In some examples, if the number of NACK messages detected by the network node 306-*a* is reduced, the network node 306-*a* may transmit (e.g., send out) a feedback collection message. Additionally, or alternatively, the network node 306-*a* may select candidate TBs (e.g., may construct a network coding message) based on processing at the network node 306-*a*, such as performing an exhaustive search via an algorithm. As such, the network node 306-*a* may reduce the likelihood of a same TB being transmitted by multiple network nodes 306 (e.g., multiple network encoders).

In some examples, to increase the number of NACK messages detected by the network node 306-*a* (e.g., to increase the likelihood of detecting NACK messages transmitted from destination UEs), the network node 306-*a* may avoid sending out accept-request messages, such as the accept-request message transmitted at 350, unnecessarily. For example, the network node 306-*a* may operate in a half-duplex mode, such that the network node 306-*a* may not transmit and receive communications simultaneously. Therefore, by reducing the number of unnecessary transmissions performed by the network node 306-*a*, the network node 306-*a* may decrease the likelihood of the network node 306-*a* failing to receive ACK messages or NACK messages (e.g., indicating whether one or more TBs have been received or successfully decoded) transmitted from UEs 315 (e.g., destination UEs). That is, due to half duplex operations at the network node 306-*a*, the network node 306-*a* may not be capable of monitoring for NACK messages while performing transmissions. As such, the network node 306-*a* may refrain from transmitting accept-request messages unnecessarily to prevent accept-request messages from being transmitted (e.g., simultaneously) when a UE 315 (e.g., a destination UE), such as the UE 315-*b*, may transmit (e.g., send out) an ACK message or a NACK message.

In some examples, the network node may determine whether to transmit an accept-request message based on the number of network nodes 306 (e.g., network encoders) operating within the wireless communications system. For example, the network node 306-*a* may refrain from transmitting accept-request messages if the number of network nodes 306 operating within the wireless communications system (e.g., a cell) satisfies (e.g., is above) a threshold. For example, as the number of network nodes operating within the cell increases, the likelihood that a request message, such as the request message transmitted at 345, will be accepted by a network node 306 (e.g., the network node 306-*a*) also increases. Therefore, if the number of network nodes 306 operating within in the cell satisfies the threshold, the UE 315-*a* (e.g., the source UE) may determine that request messages are accepted irrespective of receiving an accept-request message from one or more network nodes 306 (e.g., the network node 306-*a*). In some examples, the threshold may be specified (e.g., preconfigured or configured) at the network node 306-*a* and other network nodes 306 (e.g., for the network encoders). Additionally, or alternatively, the threshold may be signaled (e.g., via a control message transmitted dynamically or semi-statically) to the network nodes 306 (e.g., the network encoders), for example from one or more other network nodes (e.g., a base station, a CU, a DU, or an RU). Additionally, or alternatively, the network nodes 306 may determine a number of network nodes 306 (e.g., network encoders) operating within the wireless communications system (e.g., the cell) based on signaling (e.g., via a broadcast message) transmitted between the network nodes 306 or from the one or more other network nodes (e.g., the network entity, the base station, the CU, the DU, or the RU) to the network nodes 306.

In some examples, the network node 306-*a* (e.g., a network encoder) may determine one or more resources for transmitting the second set of network coding messages at 355. For example, if the network node 306-*a* transmits (e.g., send out) a network coding message in a time period (e.g., slot) that is used by the UE 315-*a* (e.g., the source UE) to transmit the request message at 345 (e.g., via one or more different subchannels), the request message (e.g., including one or more TBs to be retransmitted) may not be retransmitted (e.g., taken over by the network node 306-*a*). Additionally, or alternatively, if the network node 306-*a* transmits a network coding message in a same slot as the network node 306-*b* (e.g., one or more other network encoders), the network node 306-*a* may not be capable of monitoring for (e.g., receiving) the network coding messages transmitted by the network node 306-*b*. As such, the network node 306-*a* and the network node 306-*b* (e.g., multiple network encoders) may transmit network coding messages that include one or more same TBs.

Therefore, to reduce the likelihood of failing to receive request messages from the UE 315-*a* (e.g., the source UE) and to reduce the likelihood of multiple network nodes 306 (e.g., multiple network encoders) retransmitting a same TB, the network nodes 306 may be assigned (or may reserve) dedicated resources for transmitted network coding messages. As such, different network nodes 306 may transmit network coding messages in different slots. In some examples, one or more network nodes (e.g., the base station, the CU, the DU, or the RU) may assign one or more resources for each network node 306 (e.g., operating within a cell). For example, (e.g., in a distributed network with distributed network coding), the network may assign different slots for different network nodes 306 via the one or more network nodes. Additionally, or alternatively, each network node 306 may be configured (e.g., preconfigured) such that the network nodes 306 may reserve resources for a network coding message (e.g., a next network coding message), using a sidelink control message (e.g., sidelink control information (SCI), such as SCI-2). As such, the network nodes 306 may avoid transmitting network coding messages during time periods (e.g., in different subchannels) selected by other network nodes 306 (e.g., for transmitting network coding messages). In such examples, the dedicated resources may be assigned (e.g., reserved) based on an ID associated with the network node 306 (e.g., an encoder source ID or a source ID modulo 10). As a result, the network node 306 may increase system capacity and resource utilization within a wireless communications system, among other benefits.

Figure 4:
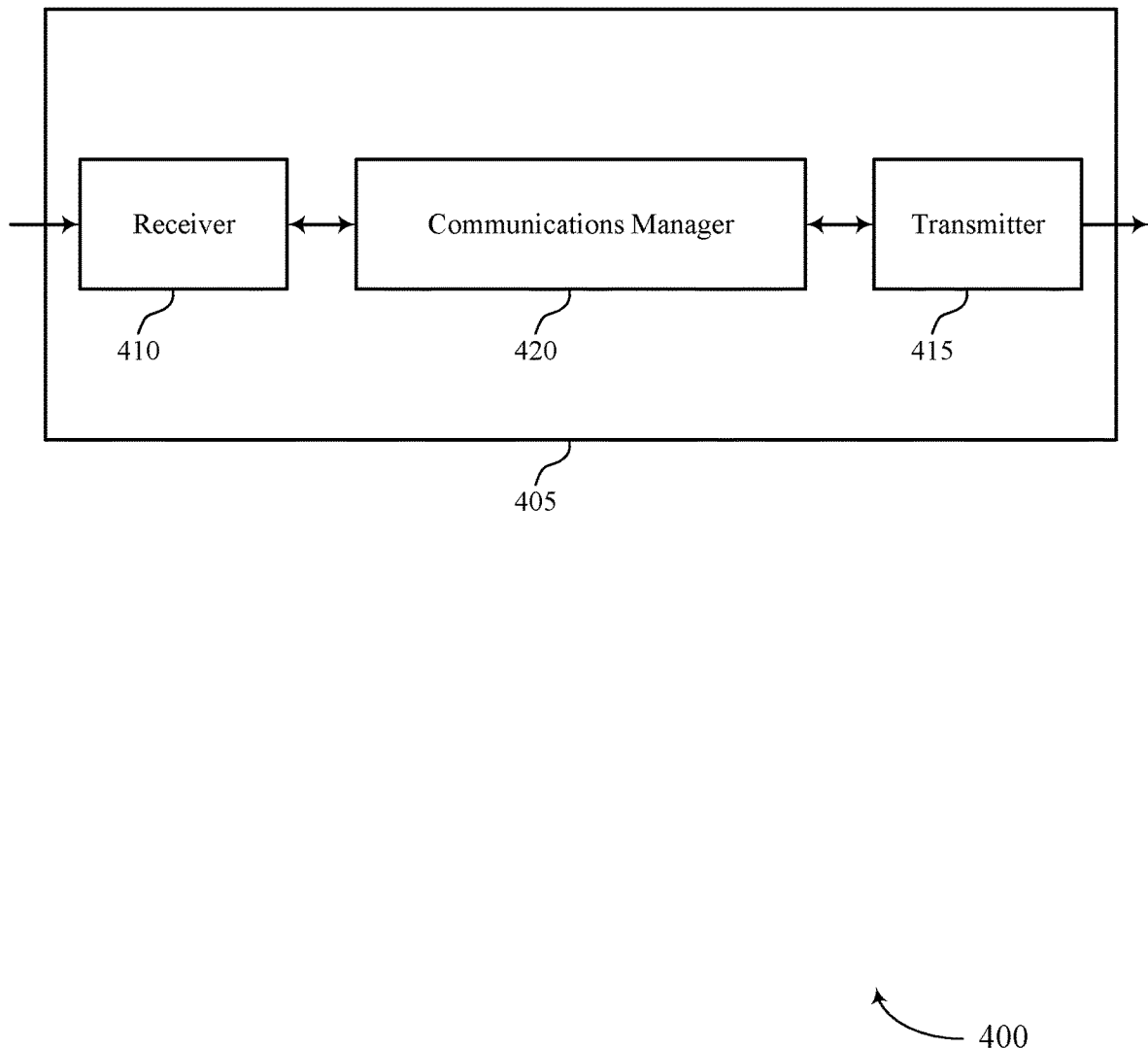
FIGS. 4 and 5 show block diagrams of devices that support a distributed multi-encoder network coding design in accordance with one or more aspects of the present disclosure.

FIG. 4 shows a block diagram 400 of a device 405 that supports a distributed multi-encoder network coding design in accordance with one or more aspects of the present disclosure. The device 405 may be an example of aspects of a network entity 105 as described herein. The device 405 may include a receiver 410, a transmitter 415, and a communications manager 420. The device 405 may also include a processor. Each of these components may be in communication with one another (e.g., via one or more buses).

The receiver 410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 405. In some examples, the receiver 410 may support obtaining information by receiving signals via one or more antennas. Additionally, or alternatively, the receiver 410 may support obtaining information by receiving signals via one or more wired (e.g., electrical, fiber optic) interfaces, wireless interfaces, or any combination thereof.

The transmitter 415 may provide a means for outputting (e.g., transmitting, providing, conveying, sending) information generated by other components of the device 405. For example, the transmitter 415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 415 may support outputting information by transmitting signals via one or more antennas. Additionally, or alternatively, the transmitter 415 may support outputting information by transmitting signals via one or more wired (e.g., electrical, fiber optic) interfaces, wireless interfaces, or any combination thereof. In some examples, the transmitter 415 and the receiver 410 may be co-located in a transceiver, which may include or be coupled with a modem.

The communications manager 420, the receiver 410, the transmitter 415, or various combinations thereof or various components thereof may be examples of means for performing various aspects of a distributed multi-encoder network coding design as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a network node (e.g., the device 405) in accordance with examples as disclosed herein. For example, the communications manager 420 may be configured as or otherwise support a means for storing in a first buffer a first set of TBs received at the network node over a wireless channel during a first time window. The communications manager 420 may be configured as or otherwise support a means for storing in a second buffer a second set of TBs received at the network node over the wireless channel during a second time window according to at least one monitoring criterion. The communications manager 420 may be configured as or otherwise support a means for receiving a first set of one or more network coding messages over the wireless channel, where receiving the first set of one or more network coding messages includes decoding the first set of one or more network coding messages based on the first set of TBs in the first buffer. The communications manager 420 may be configured as or otherwise support a means for transmitting a second set of one or more network coding messages corresponding to a portion of the second set of TBs in the second buffer, where the portion is selected based on the first set of one or more network coding messages.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for reduced processing, reduced power consumption, and more efficient utilization of communication resources.

Figure 5:
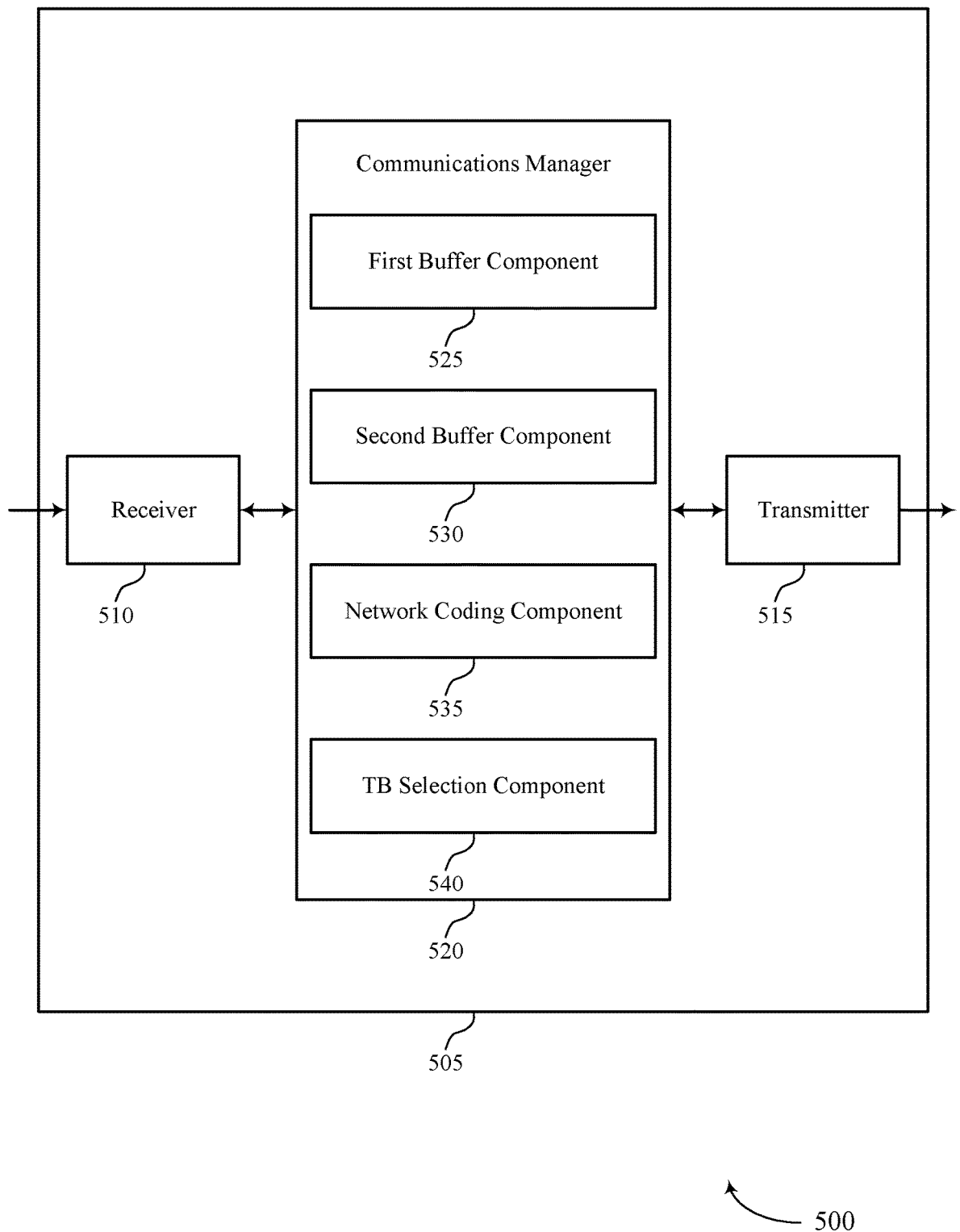

FIG. 5 shows a block diagram 500 of a device 505 that supports a distributed multi-encoder network coding design in accordance with one or more aspects of the present disclosure. The device 505 may be an example of aspects of a device 405 or a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The device 505, or various components thereof, may be an example of means for performing various aspects of a distributed multi-encoder network coding design as described herein. For example, the communications manager 520 may include a first buffer component 525, a second buffer component 530, a network coding component 535, a TB selection component 540, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a network node (e.g., the device 505) in accordance with examples as disclosed herein. The first buffer component 525 may be configured as or otherwise support a means for storing in a first buffer a first set of TBs received at the network node over a wireless channel during a first time window. The second buffer component 530 may be configured as or otherwise support a means for storing in a second buffer a second set of TBs received at the network node over the wireless channel during a second time window according to at least one monitoring criterion. The network coding component 535 may be configured as or otherwise support a means for receiving a first set of one or more network coding messages over the wireless channel, where receiving the first set of one or more network coding messages includes decoding the first set of one or more network coding messages based on the first set of TBs in the first buffer. The TB selection component 540 may be configured as or otherwise support a means for transmitting a second set of one or more network coding messages corresponding to a portion of the second set of TBs in the second buffer, where the portion is selected based on the first set of one or more network coding messages.

Figure 6:
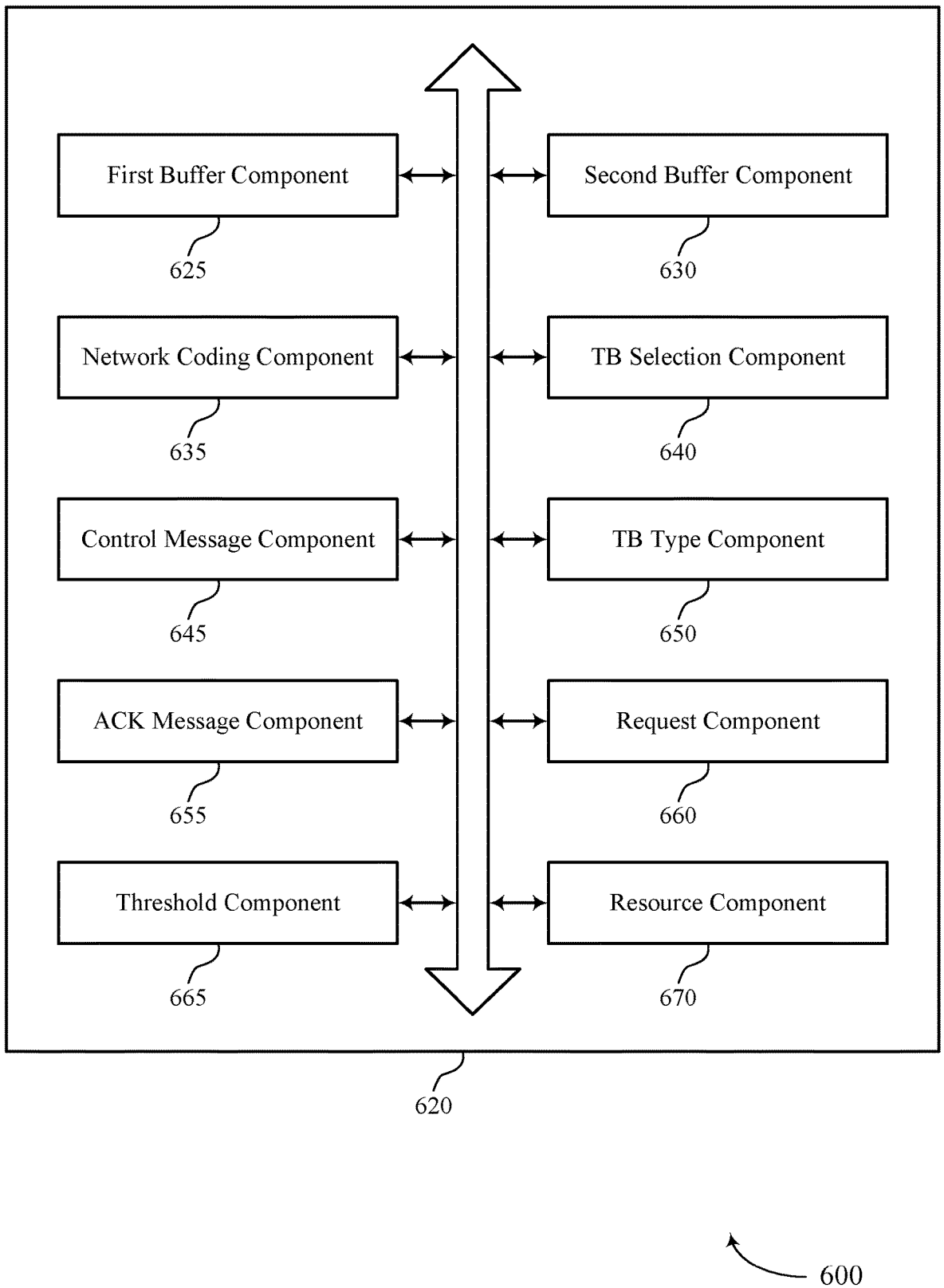
FIG. 6 shows a block diagram of a communications manager that supports a distributed multi-encoder network coding design in accordance with one or more aspects of the present disclosure.

FIG. 6 shows a block diagram 600 of a communications manager 620 that supports a distributed multi-encoder network coding design in accordance with one or more aspects of the present disclosure. The communications manager 620 may be an example of aspects of a communications manager 420, a communications manager 520, or both, as described herein. The communications manager 620, or various components thereof, may be an example of means for performing various aspects of a distributed multi-encoder network coding design as described herein. For example, the communications manager 620 may include a first buffer component 625, a second buffer component 630, a network coding component 635, a TB selection component 640, a control message component 645, a TB type component 650, an ACK message component 655, a request component 660, a threshold component 665, a resource component 670, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 620 may support wireless communication at a network node (e.g., a network node 206) in accordance with examples as disclosed herein. The first buffer component 625 may be configured as or otherwise support a means for storing in a first buffer a first set of TBs received at the network node over a wireless channel during a first time window. The second buffer component 630 may be configured as or otherwise support a means for storing in a second buffer a second set of TBs received at the network node over the wireless channel during a second time window according to at least one monitoring criterion. The network coding component 635 may be configured as or otherwise support a means for receiving a first set of one or more network coding messages over the wireless channel, where receiving the first set of one or more network coding messages includes decoding the first set of one or more network coding messages based on the first set of TBs in the first buffer. The TB selection component 640 may be configured as or otherwise support a means for transmitting a second set of one or more network coding messages corresponding to a portion of the second set of TBs in the second buffer, where the portion is selected based on the first set of one or more network coding messages.

In some examples, the control message component 645 may be configured as or otherwise support a means for receiving a control message including an indication of the first time window, the second time window, or both. In some examples, the first time window corresponds to a first value and the second time window corresponds to a second value, the first value being equal to or greater than the second value and the first value and the second value being less than a third value corresponding to a maximum duration for buffering TBs.

In some examples, the first time window, the second time window, or both, are associated with a resource pool of a set of multiple resource pools, and the set of multiple resource pools is associated with transmitting network coding messages, receiving the network coding messages, or both. In some examples, the first set of TBs is stored in the first buffer during the first time window irrespective of a decoding status of one or more TBs of the first set of TBs, the decoding status corresponding to decoding of the one or more TBs at one or more intended recipients of the one or more TBs.

In some examples, the second buffer component 630 may be configured as or otherwise support a means for storing at least one TB of the second set of TBs in the second buffer based on a receive time of the at least one TB and a PDB, the at least one monitoring criterion including the PDB. In some examples, the second buffer component 630 may be configured as or otherwise support a means for storing at least one TB of the second set of TBs in the second buffer based on a location of a device associated with the at least one TB, the at least one monitoring criterion including the location. In some examples, the second buffer component 630 may be configured as or otherwise support a means for storing at least one TB of the second set of TBs in the second buffer based on a device ID associated with the at least one TB, the at least one monitoring criterion including the device ID.

In some examples, the TB type component 650 may be configured as or otherwise support a means for receiving a message instructing the network node to refrain from using TBs of a first TB type for decoding network coding messages. In some examples, the second buffer component 630 may be configured as or otherwise support a means for storing at least one TB of the second set of TBs in the second buffer based on the at least one TB being of a type different from the first TB type, the at least one monitoring criterion including the first TB type.

In some examples, the network coding component 635 may be configured as or otherwise support a means for monitoring for network coding messages, where receiving the first set of one or more network coding messages over the wireless channel is based on the monitoring. In some examples, the network coding component 635 may be configured as or otherwise support a means for decoding a network coding message of the first set of one or more network coding messages to obtain at least one TB of the network coding message. In some examples, the second buffer component 630 may be configured as or otherwise support a means for storing the at least one TB of the network coding message in the second buffer based on the decoding.

In some examples, the second buffer component 630 may be configured as or otherwise support a means for updating the second buffer by erasing at least one TB of the second set of TBs based on the first set of one or more network coding messages including a network coding message that includes the at least one TB. In some examples, the second buffer component 630 may be configured as or otherwise support a means for updating the second buffer by erasing at least one TB of the second set of TBs based on the first set of one or more network coding messages including a feedback collection message that includes the at least one TB.

In some examples, the ACK message component 655 may be configured as or otherwise support a means for receiving an ACK message transmitted to a device capable of performing network coding. In some examples, the second buffer component 630 may be configured as or otherwise support a means for updated the second buffer based on receiving the ACK message. In some examples, to support updating the second buffer, the second buffer component 630 may be configured as or otherwise support a means for erasing at least one TB of the second set of TBs based on determining that the ACK message corresponds to the at least one TB.

In some examples, the ACK message component 655 may be configured as or otherwise support a means for receiving a number of ACK messages transmitted to one or more devices capable of performing network coding, where the portion of the second set of TBs is further selected based on the number of ACK messages. In some examples, the portion of the second set of TBs corresponds to a first value based on the number of ACK messages being greater than a threshold. In some examples, the portion of the second set of TBs corresponds to a second value based on the number of ACK messages being less than the threshold, the first value being less than the second value.

In some examples, the request component 660 may be configured as or otherwise support a means for receiving a first message including a request for the network node to transmit a network coding message. In some examples, the threshold component 665 may be configured as or otherwise support a means for transmitting a second message accepting the request or refraining from transmitting the second message based on a difference between a number of devices capable of performing network coding and a threshold.

In some examples, the threshold component 665 may be configured as or otherwise support a means for transmitting the second message based on the number of devices capable of performing the network coding being less than the threshold. In some examples, the threshold component 665 may be configured as or otherwise support a means for receiving a message including an indication of the threshold, the message being a control message or a broadcast message.

In some examples, to support transmitting the second set of one or more network coding messages, the resource component 670 may be configured as or otherwise support a means for transmitting the second set of one or more network coding messages using a set of one or more dedicated resources for transmitting network coding messages. In some examples, the resource component 670 may be configured as or otherwise support a means for receiving a control message including an indication of the set of one or more dedicated resources, where transmitting the second set of one or more network coding messages is based on the indication. In some examples, the resource component 670 may be configured as or otherwise support a means for transmitting a sidelink control message to reserve one or more resources for performing sidelink communications, where the set of one or more dedicated resources includes the one or more resources.

Figure 7:
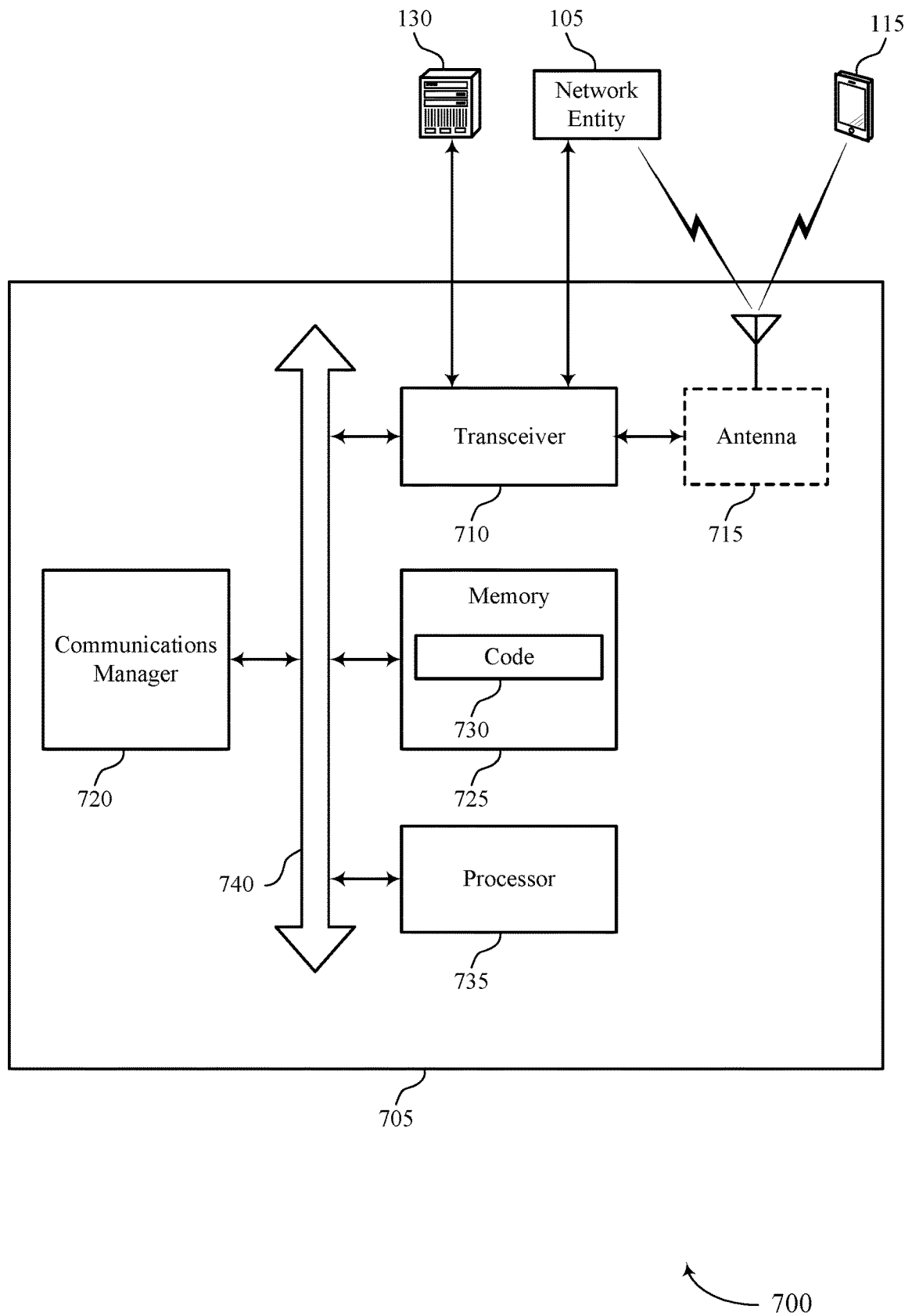
FIG. 7 shows a diagram of a system including a device that supports a distributed multi-encoder network coding design in accordance with one or more aspects of the present disclosure.

FIG. 7 shows a diagram of a system 700 including a device 705 that supports a distributed multi-encoder network coding design in accordance with one or more aspects of the present disclosure. The device 705 may be an example of or include the components of a device 405, a device 505, or a network entity 105 as described herein. The device 705 may communicate with one or more network entities 105, one or more UEs 115, or any combination thereof, which may include communications over one or more wired interfaces, over one or more wireless interfaces, or any combination thereof. The device 705 may include components that support outputting and obtaining communications, such as a communications manager 720, a transceiver 710, an antenna 715, a memory 725, code 730, and a processor 735. These components may be in electronic communication or otherwise coupled (e.g., operatively, communicatively, functionally, electronically, electrically) via one or more buses (e.g., a bus 740).

The transceiver 710 may support bi-directional communications via wired links, wireless links, or both as described herein. In some examples, the transceiver 710 may include a wired transceiver and may communicate bi-directionally with another wired transceiver. Additionally, or alternatively, in some examples, the transceiver 710 may include a wireless transceiver and may communicate bi-directionally with another wireless transceiver. In some examples, the device 705 may include one or more antennas 715, which may be capable of transmitting or receiving wireless transmissions (e.g., concurrently). The transceiver 710 may also include a modem to modulate signals, to provide the modulated signals for transmission (e.g., by one or more antennas 715, by a wired transmitter), to receive modulated signals (e.g., from one or more antennas 715, from a wired receiver), and to demodulate signals. The transceiver 710, or the transceiver 710 and one or more antennas 715 or wired interfaces, where applicable, may be an example of a transmitter 415, a transmitter 515, a receiver 410, a receiver 510, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 725 may include RAM and ROM. The memory 725 may store computer-readable, computer-executable code 730 including instructions that, when executed by the processor 735, cause the device 705 to perform various functions described herein. The code 730 may be stored in a non-transitory computer-readable medium such as system memory or another type of memory. In some cases, the code 730 may not be directly executable by the processor 735 but may cause a computer (e.g., when compiled and executed) to perform functions described herein. In some cases, the memory 725 may contain, among other things, a BIOS which may control basic hardware or software operation such as the interaction with peripheral components or devices.

The processor 735 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 735 may be configured to operate a memory array using a memory controller. In some other cases, a memory controller may be integrated into the processor 735. The processor 735 may be configured to execute computer-readable instructions stored in a memory (e.g., the memory 725) to cause the device 705 to perform various functions (e.g., functions or tasks supporting a distributed multi-encoder network coding design). For example, the device 705 or a component of the device 705 may include a processor 735 and memory 725 coupled with the processor 735, the processor 735 and memory 725 configured to perform various functions described herein. The processor 735 may be an example of a cloud-computing platform (e.g., one or more physical nodes and supporting software such as operating systems, virtual machines, or container instances) that may host the functions (e.g., by executing code 730) to perform the functions of the device 705.

In some examples, a bus 740 may support communications of (e.g., within) a protocol layer of a protocol stack. In some examples, a bus 740 may support communications associated with a logical channel of a protocol stack (e.g., between protocol layers of a protocol stack), which may include communications performed within a component of the device 705, or between different components of the device 705 that may be co-located or located in different locations (e.g., where the device 705 may refer to a system in which one or more of the communications manager 720, the transceiver 710, the memory 725, the code 730, and the processor 735 may be located in one of the different components or divided between different components).

In some examples, the communications manager 720 may manage aspects of communications with a core network 130 (e.g., via one or more wired or wireless backhaul links). For example, the communications manager 720 may manage the transfer of data communications for client devices, such as one or more UEs 115. In some examples, the communications manager 720 may manage communications with other network entities 105, and may include a controller or scheduler for controlling communications with UEs 115 in cooperation with other network entities 105. In some examples, the communications manager 720 may support an X2 interface within an LTE/LTE-A wireless communications network technology to provide communication between network entities 105.

The communications manager 720 may support wireless communication at a network node (e.g., the device 705) in accordance with examples as disclosed herein. For example, the communications manager 720 may be configured as or otherwise support a means for storing in a first buffer a first set of TBs received at the network node over a wireless channel during a first time window. The communications manager 720 may be configured as or otherwise support a means for storing in a second buffer a second set of TBs received at the network node over the wireless channel during a second time window according to at least one monitoring criterion. The communications manager 720 may be configured as or otherwise support a means for receiving a first set of one or more network coding messages over the wireless channel, where receiving the first set of one or more network coding messages includes decoding the first set of one or more network coding messages based on the first set of TBs in the first buffer. The communications manager 720 may be configured as or otherwise support a means for transmitting a second set of one or more network coding messages corresponding to a portion of the second set of TBs in the second buffer, where the portion is selected based on the first set of one or more network coding messages.

By including or configuring the communications manager 720 in accordance with examples as described herein, the device 705 may support techniques for improved communication reliability, improved user experience related to reduced processing, more efficient utilization of communication resources, improved coordination between devices, and improved utilization of processing capability.

In some examples, the communications manager 720 may be configured to perform various operations (e.g., receiving, obtaining, monitoring, outputting, transmitting) using or otherwise in cooperation with the transceiver 710, the one or more antennas 715 (e.g., where applicable), or any combination thereof. Although the communications manager 720 is illustrated as a separate component, in some examples, one or more functions described with reference to the communications manager 720 may be supported by or performed by the processor 735, the memory 725, the code 730, the transceiver 710, or any combination thereof. For example, the code 730 may include instructions executable by the processor 735 to cause the device 705 to perform various aspects of a distributed multi-encoder network coding design as described herein, or the processor 735 and the memory 725 may be otherwise configured to perform or support such operations.

Figure 8:
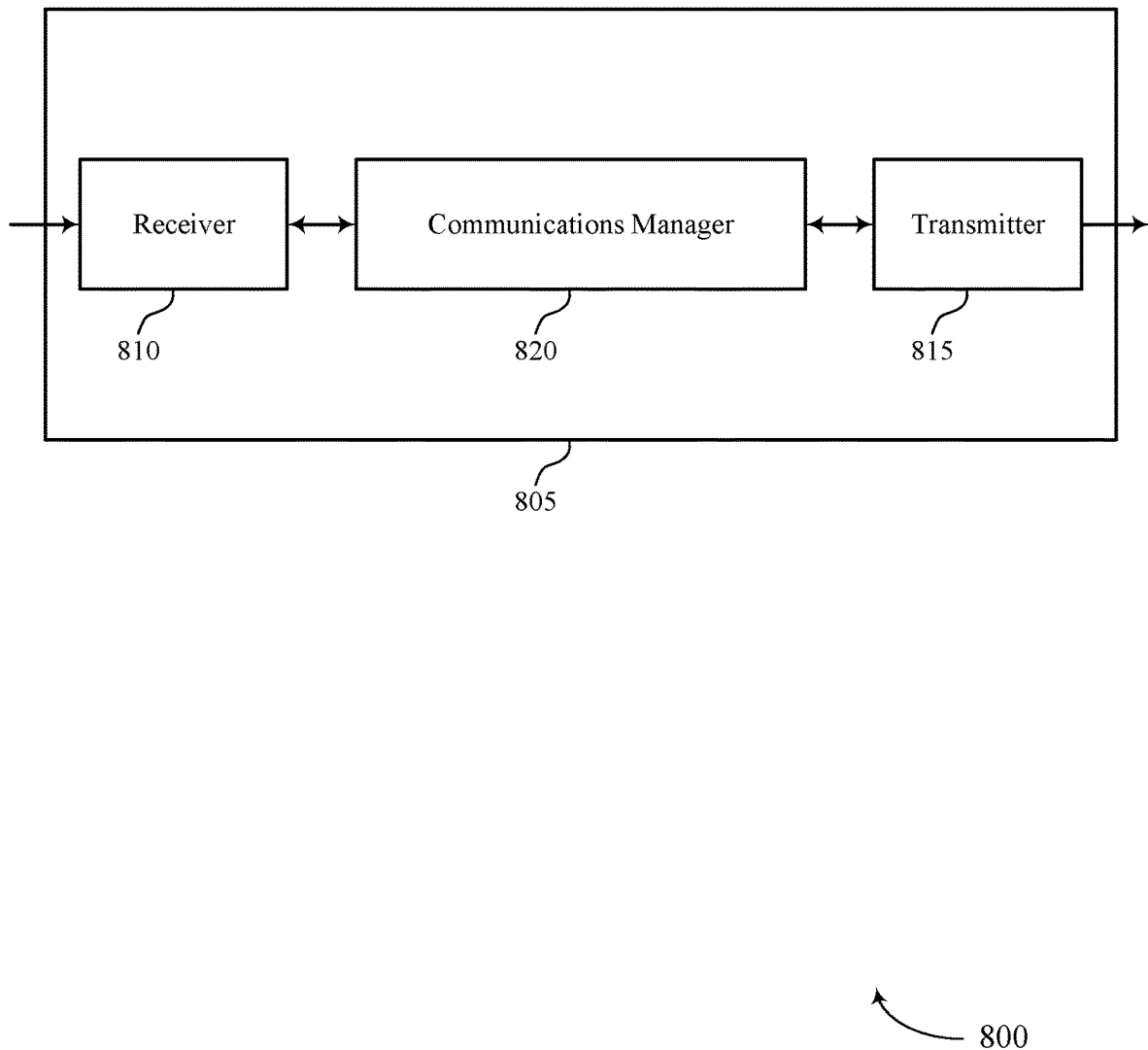
FIGS. 8 and 9 show block diagrams of devices that support a distributed multi-encoder network coding design in accordance with one or more aspects of the present disclosure.

FIG. 8 shows a block diagram 800 of a device 805 that supports a distributed multi-encoder network coding design in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to a distributed multi-encoder network coding design). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to a distributed multi-encoder network coding design). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of a distributed multi-encoder network coding design as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a network node (e.g., the device 805) in accordance with examples as disclosed herein. For example, the communications manager 820 may be configured as or otherwise support a means for storing in a first buffer a first set of TBs received at the network node over a wireless channel during a first time window. The communications manager 820 may be configured as or otherwise support a means for storing in a second buffer a second set of TBs received at the network node over the wireless channel during a second time window according to at least one monitoring criterion. The communications manager 820 may be configured as or otherwise support a means for receiving a first set of one or more network coding messages over the wireless channel, where receiving the first set of one or more network coding messages includes decoding the first set of one or more network coding messages based on the first set of TBs in the first buffer. The communications manager 820 may be configured as or otherwise support a means for transmitting a second set of one or more network coding messages corresponding to a portion of the second set of TBs in the second buffer, where the portion is selected based on the first set of one or more network coding messages.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing, reduced power consumption, and more efficient utilization of communication resources.

Figure 9:
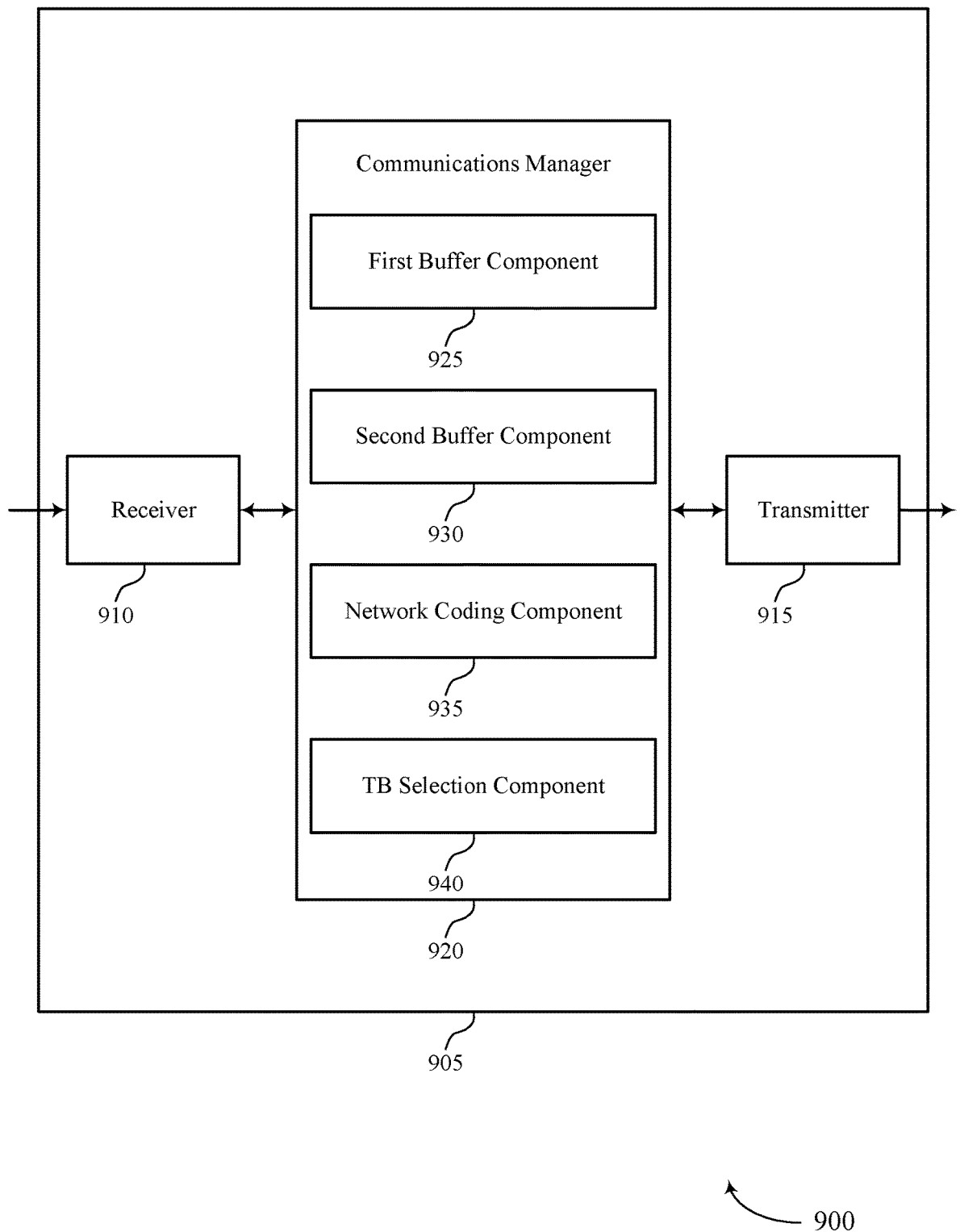

FIG. 9 shows a block diagram 900 of a device 905 that supports a distributed multi-encoder network coding design in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to a distributed multi-encoder network coding design). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to a distributed multi-encoder network coding design). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of a distributed multi-encoder network coding design as described herein. For example, the communications manager 920 may include a first buffer component 925, a second buffer component 930, a network coding component 935, a TB selection component 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network node (e.g., the device 905) in accordance with examples as disclosed herein. The first buffer component 925 may be configured as or otherwise support a means for storing in a first buffer a first set of TBs received at the network node over a wireless channel during a first time window. The second buffer component 930 may be configured as or otherwise support a means for storing in a second buffer a second set of TBs received at the network node over the wireless channel during a second time window according to at least one monitoring criterion. The network coding component 935 may be configured as or otherwise support a means for receiving a first set of one or more network coding messages over the wireless channel, where receiving the first set of one or more network coding messages includes decoding the first set of one or more network coding messages based on the first set of TBs in the first buffer. The TB selection component 940 may be configured as or otherwise support a means for transmitting a second set of one or more network coding messages corresponding to a portion of the second set of TBs in the second buffer, where the portion is selected based on the first set of one or more network coding messages.

Figure 10:
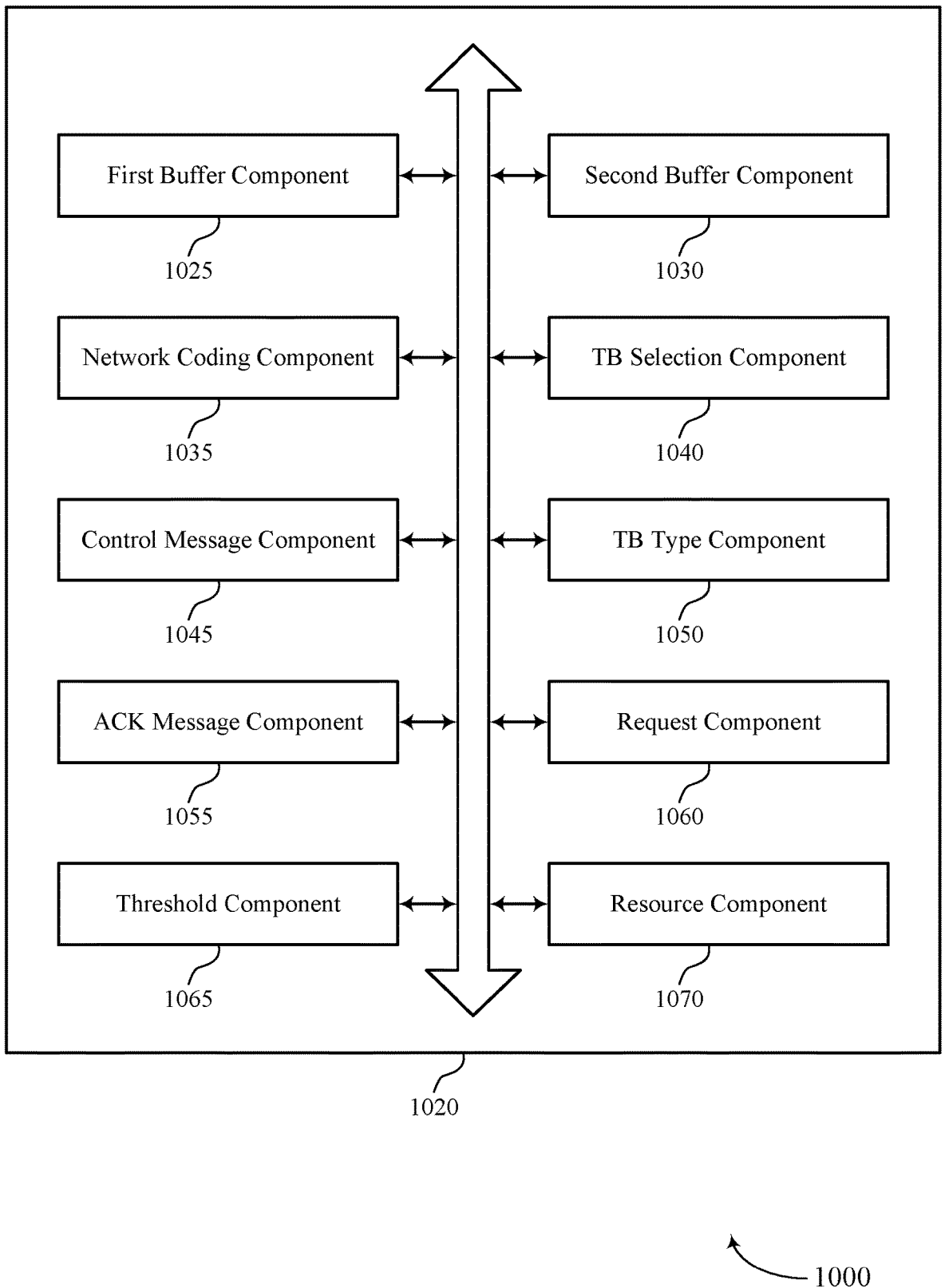
FIG. 10 shows a block diagram of a communications manager that supports a distributed multi-encoder network coding design in accordance with one or more aspects of the present disclosure.

FIG. 10 shows a block diagram 1000 of a communications manager 1020 that supports a distributed multi-encoder network coding design in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of a distributed multi-encoder network coding design as described herein. For example, the communications manager 1020 may include a first buffer component 1025, a second buffer component 1030, a network coding component 1035, a TB selection component 1040, a control message component 1045, a TB type component 1050, an ACK message component 1055, a request component 1060, a threshold component 1065, a resource component 1070, or any combination thereof. Each of these components may communicate, directly or indirectly, with one another (e.g., via one or more buses).

The communications manager 1020 may support wireless communication at a network node (e.g., a UE 115) in accordance with examples as disclosed herein. The first buffer component 1025 may be configured as or otherwise support a means for storing in a first buffer a first set of TBs received at the network node over a wireless channel during a first time window. The second buffer component 1030 may be configured as or otherwise support a means for storing in a second buffer a second set of TBs received at the network node over the wireless channel during a second time window according to at least one monitoring criterion. The network coding component 1035 may be configured as or otherwise support a means for receiving a first set of one or more network coding messages over the wireless channel, where receiving the first set of one or more network coding messages includes decoding the first set of one or more network coding messages based on the first set of TBs in the first buffer. The TB selection component 1040 may be configured as or otherwise support a means for transmitting a second set of one or more network coding messages corresponding to a portion of the second set of TBs in the second buffer, where the portion is selected based on the first set of one or more network coding messages.

In some examples, the control message component 1045 may be configured as or otherwise support a means for receiving a control message including an indication of the first time window, the second time window, or both. In some examples, the first time window corresponds to a first value and the second time window corresponds to a second value, the first value being equal to or greater than the second value and the first value and the second value being less than a third value corresponding to a maximum duration for buffering TBs.

In some examples, the first time window, the second time window, or both, are associated with a resource pool of a set of multiple resource pools, and the set of multiple resource pools is associated with transmitting network coding messages, receiving the network coding messages, or both. In some examples, the first set of TBs is stored in the first buffer during the first time window irrespective of a decoding status of one or more TBs of the first set of TBs, the decoding status corresponding to decoding of the one or more TBs at one or more intended recipients of the one or more TBs.

In some examples, the second buffer component 1030 may be configured as or otherwise support a means for storing at least one TB of the second set of TBs in the second buffer based on a receive time of the at least one TB and a packet delay budget, the at least one monitoring criterion including the packet delay budget. In some examples, the second buffer component 1030 may be configured as or otherwise support a means for storing at least one TB of the second set of TBs in the second buffer based on a location of a device associated with the at least one TB, the at least one monitoring criterion including the location. In some examples, the second buffer component 1030 may be configured as or otherwise support a means for storing at least one TB of the second set of TBs in the second buffer based on a device ID associated with the at least one TB, the at least one monitoring criterion including the device ID.

In some examples, the TB type component 1050 may be configured as or otherwise support a means for receiving a message instructing the network node to refrain from using TBs of a first TB type for decoding network coding messages. In some examples, the second buffer component 1030 may be configured as or otherwise support a means for storing at least one TB of the second set of TBs in the second buffer based on the at least one TB being of a type different from the first TB type, the at least one monitoring criterion including the first TB type.

In some examples, the network coding component 1035 may be configured as or otherwise support a means for monitoring for network coding messages, where receiving the first set of one or more network coding messages over the wireless channel is based on the monitoring. In some examples, the network coding component 1035 may be configured as or otherwise support a means for decoding a network coding message of the first set of one or more network coding messages to obtain at least one TB of the network coding message. In some examples, the second buffer component 1030 may be configured as or otherwise support a means for storing the at least one TB of the network coding message in the second buffer based on the decoding.

In some examples, the second buffer component 1030 may be configured as or otherwise support a means for updating the second buffer by erasing at least one TB of the second set of TBs based on the first set of one or more network coding messages including a network coding message that includes the at least one TB. In some examples, the second buffer component 1030 may be configured as or otherwise support a means for updating the second buffer by erasing at least one TB of the second set of TBs based on the first set of one or more network coding messages including a feedback collection message that includes the at least one TB.

In some examples, the ACK message component 1055 may be configured as or otherwise support a means for receiving an ACK message transmitted to a device capable of performing network coding. In some examples, the second buffer component 1030 may be configured as or otherwise support a means for updated the second buffer based on receiving the ACK message. In some examples, to support updating the second buffer, the second buffer component 1030 may be configured as or otherwise support a means for erasing at least one TB of the second set of TBs based on determining that the ACK message corresponds to the at least one TB.

In some examples, the ACK message component 1055 may be configured as or otherwise support a means for receiving a number of ACK messages transmitted to one or more devices capable of performing network coding, where the portion of the second set of TBs is further selected based on the number of ACK messages. In some examples, the portion of the second set of TBs corresponds to a first value based on the number of ACK messages being greater than a threshold. In some examples, the portion of the second set of TBs corresponds to a second value based on the number of ACK messages being less than the threshold, the first value being less than the second value.

In some examples, the request component 1060 may be configured as or otherwise support a means for receiving a first message including a request for the network node to transmit a network coding message. In some examples, the threshold component 1065 may be configured as or otherwise support a means for transmitting a second message accepting the request or refraining from transmitting the second message based on a difference between a number of devices capable of performing network coding and a threshold.

In some examples, the threshold component 1065 may be configured as or otherwise support a means for transmitting the second message based on the number of devices capable of performing the network coding being less than the threshold. In some examples, the threshold component 1065 may be configured as or otherwise support a means for receiving a message including an indication of the threshold, the message being a control message or a broadcast message.

In some examples, to support transmitting the second set of one or more network coding messages, the resource component 1070 may be configured as or otherwise support a means for transmitting the second set of one or more network coding messages using a set of one or more dedicated resources for transmitting network coding messages. In some examples, the resource component 1070 may be configured as or otherwise support a means for receiving a control message including an indication of the set of one or more dedicated resources, where transmitting the second set of one or more network coding messages is based on the indication. In some examples, the resource component 1070 may be configured as or otherwise support a means for transmitting a sidelink control message to reserve one or more resources for performing sidelink communications, where the set of one or more dedicated resources includes the one or more resources.

Figure 11:
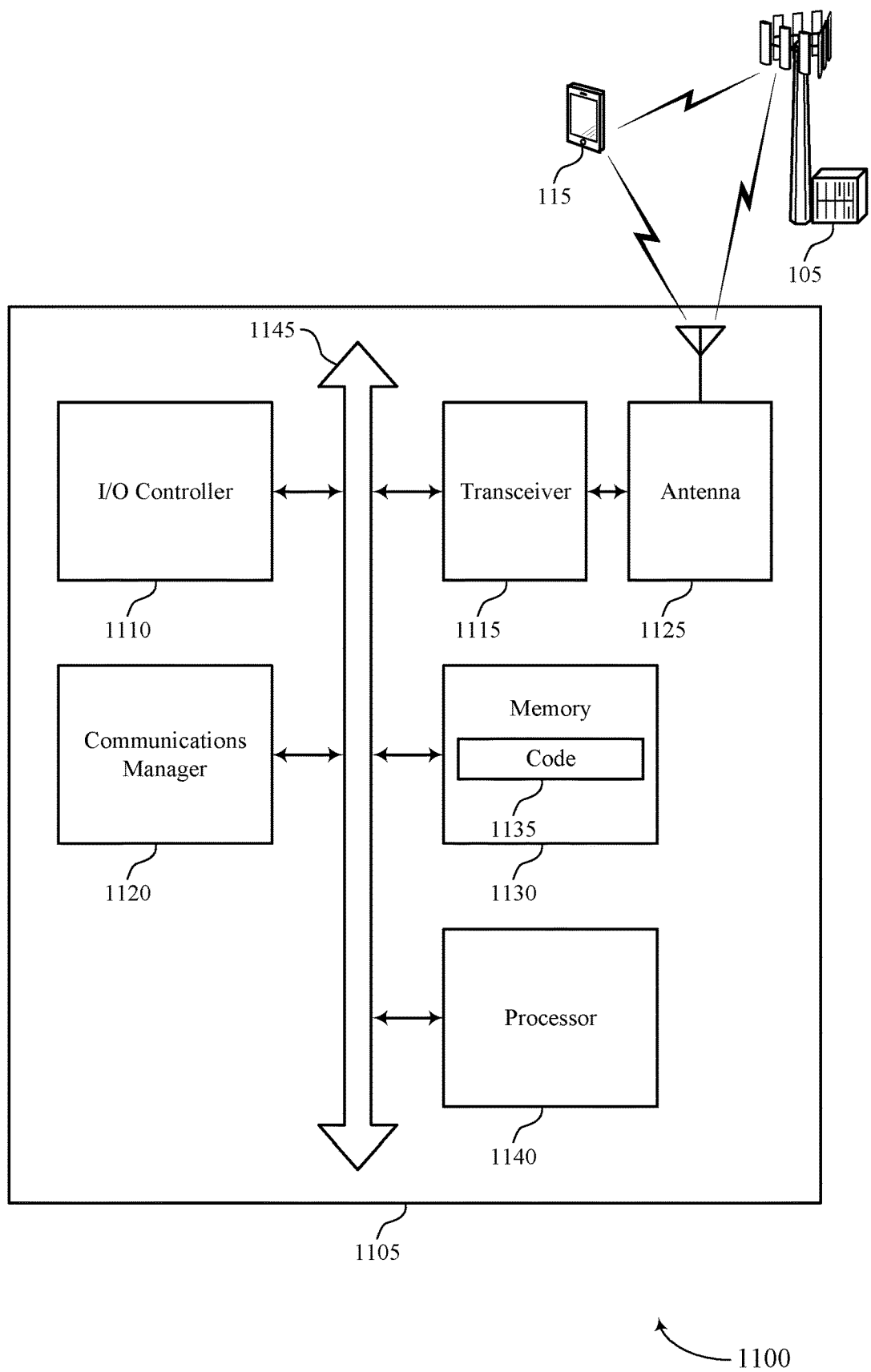
FIG. 11 shows a diagram of a system including a device that supports a distributed multi-encoder network coding design in accordance with one or more aspects of the present disclosure.

FIG. 11 shows a diagram of a system 1100 including a device 1105 that supports a distributed multi-encoder network coding design in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting a distributed multi-encoder network coding design). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a network node (e.g., the device 1105) in accordance with examples as disclosed herein. For example, the communications manager 1120 may be configured as or otherwise support a means for storing in a first buffer a first set of TBs received at the network node over a wireless channel during a first time window. The communications manager 1120 may be configured as or otherwise support a means for storing in a second buffer a second set of TBs received at the network node over the wireless channel during a second time window according to at least one monitoring criterion. The communications manager 1120 may be configured as or otherwise support a means for receiving a first set of one or more network coding messages over the wireless channel, where receiving the first set of one or more network coding messages includes decoding the first set of one or more network coding messages based on the first set of TBs in the first buffer. The communications manager 1120 may be configured as or otherwise support a means for transmitting a second set of one or more network coding messages corresponding to a portion of the second set of TBs in the second buffer, where the portion is selected based on the first set of one or more network coding messages.

By including or configuring the communications manager 1120 in accordance with examples as described herein, the device 1105 may support techniques for improved communication reliability, reduced latency, reduced power consumption, more efficient utilization of communication resources, improved coordination between devices, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of a distributed multi-encoder network coding design as described herein, or the processor 1140 and the memory 1130 may be otherwise configured to perform or support such operations.

Figure 12:
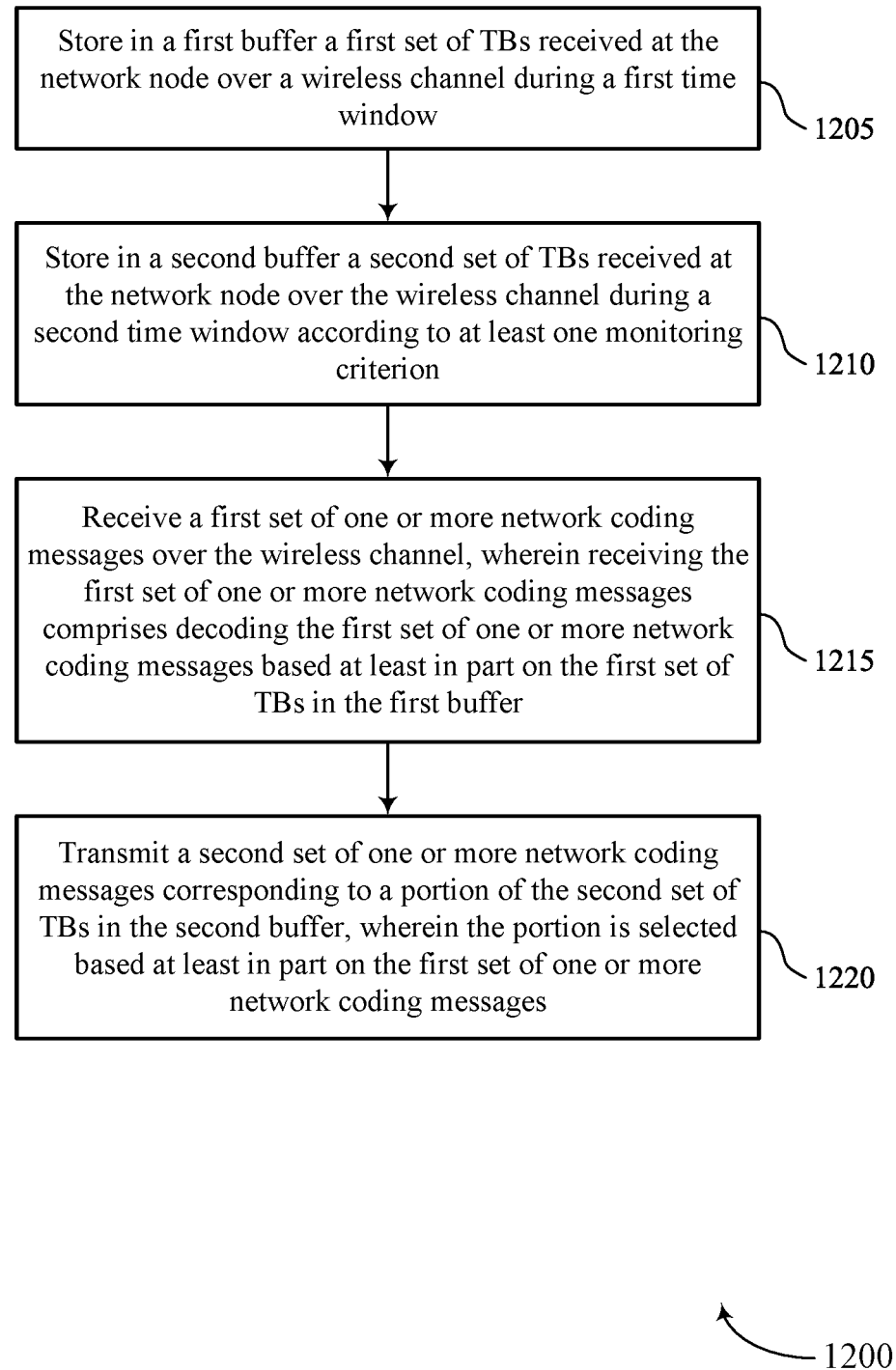
FIGS. 12 and 13 show flowcharts illustrating methods that support a distributed multi-encoder network coding design in accordance with one or more aspects of the present disclosure.

FIG. 12 shows a flowchart illustrating a method 1200 that supports a distributed multi-encoder network coding design in accordance with one or more aspects of the present disclosure. The operations of the method 1200 may be implemented by one or more network entities (e.g., a base station, a CU, a DU, or an RU), an RSU, a relay node, or a UE or the components of the one or more network entities, the RSU, the relay node, or the UE as described herein. For example, the operations of the method 1200 may be performed by a network node as described with reference to FIGS. 1 through 7 or a UE 115 as described with reference to FIGS. 1 through 3 and 8 through 11. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 1205, the method may include storing in a first buffer a first set of TBs received at the network node over a wireless channel during a first time window. The operations of 1205 may be performed in accordance with examples as disclosed herein. In some examples, aspects of the operations of 1205 may be performed by a first buffer component 625 or a first buffer component 1025 as described with reference to FIGS. 6 and 10.

At 1210, the method may include storing in a second buffer a second set of TBs received at the network node over the wireless channel during a second time window according to at least one monitoring criterion. The operations of 1210 may be performed in accordance with examples as disclosed herein. In some examples, aspects of the operations of 1210 may be performed by a second buffer component 630 or a second buffer component 1030 as described with reference to FIGS. 6 and 10.

At 1215, the method may include receiving a first set of one or more network coding messages over the wireless channel, where receiving the first set of one or more network coding messages includes decoding the first set of one or more network coding messages based on the first set of TBs in the first buffer. The operations of 1215 may be performed in accordance with examples as disclosed herein. In some examples, aspects of the operations of 1215 may be performed by a network coding component 635 or a network coding component 1035 as described with reference to FIGS. 6 and 10.

At 1220, the method may include transmitting a second set of one or more network coding messages corresponding to a portion of the second set of TBs in the second buffer, where the portion is selected based on the first set of one or more network coding messages. The operations of 1220 may be performed in accordance with examples as disclosed herein. In some examples, aspects of the operations of 1220 may be performed by a TB selection component 640 or a TB selection component 1040 as described with reference to FIGS. 6 and 10.

Figure 13:
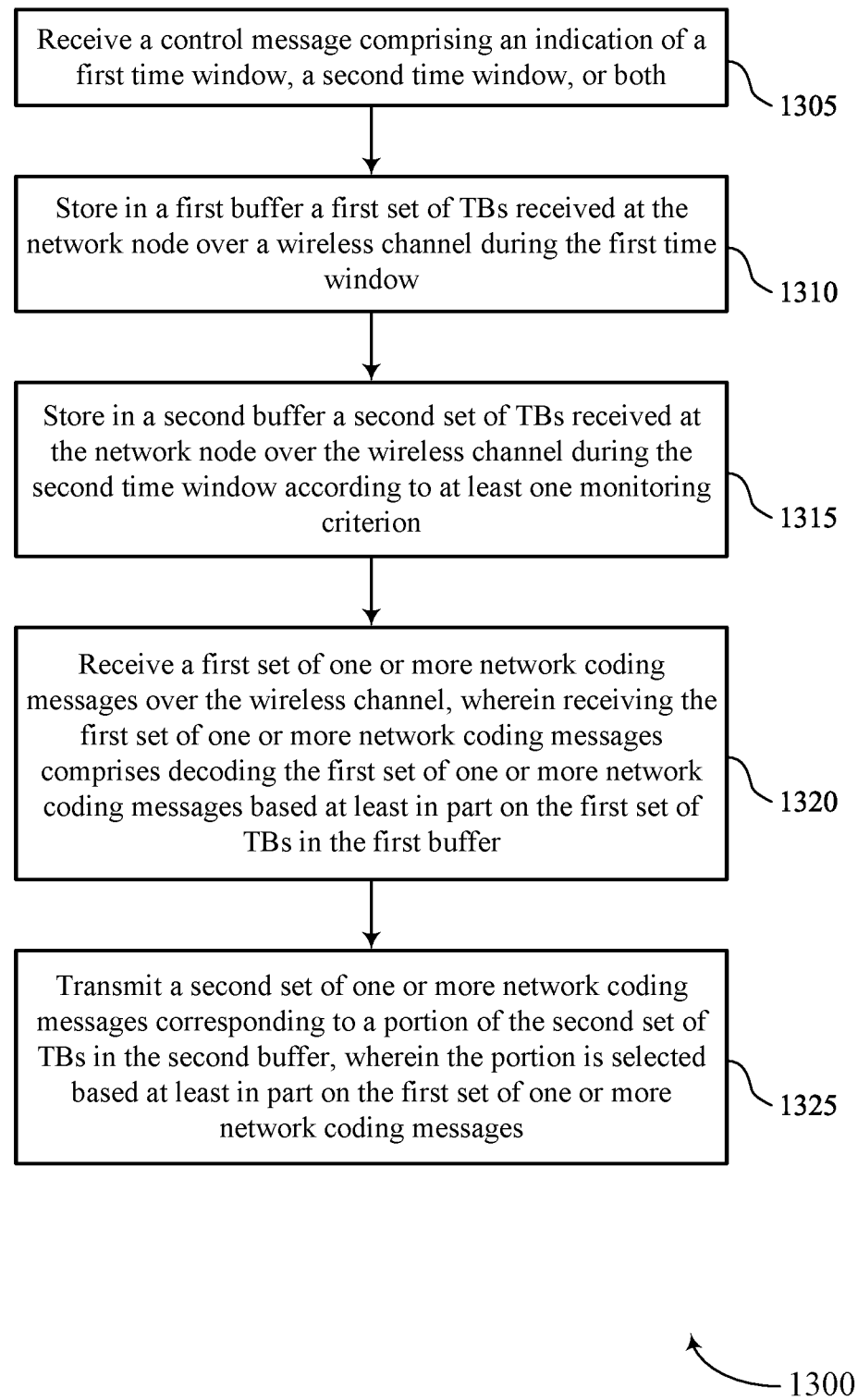

FIG. 13 shows a flowchart illustrating a method 1300 that supports a distributed multi-encoder network coding design in accordance with one or more aspects of the present disclosure. The operations of the method 1300 may be implemented by one or more network entities (e.g., a base station, a CU, a DU, or an RU), an RSU, a relay node, or a UE or the components of the one or more network entities, the RSU, the relay node, or the UE as described herein. For example, the operations of the method 1300 may be performed by a network node as described with reference to FIGS. 1 through 7 or a UE 115 as described with reference to FIGS. 1 through 3 and 8 through 11. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 1305, the method may include receiving a control message including an indication of a first time window, a second time window, or both. The operations of 1305 may be performed in accordance with examples as disclosed herein. In some examples, aspects of the operations of 1305 may be performed by a control message component 645 or a control message component 1045 as described with reference to FIGS. 6 and 10.

At 1310, the method may include storing in a first buffer a first set of TBs received at the network node over a wireless channel during the first time window. The operations of 1310 may be performed in accordance with examples as disclosed herein. In some examples, aspects of the operations of 1310 may be performed by a first buffer component 625 or a first buffer component 1025 as described with reference to FIGS. 6 and 10.

At 1315, the method may include storing in a second buffer a second set of TBs received at the network node over the wireless channel during the second time window according to at least one monitoring criterion. The operations of 1315 may be performed in accordance with examples as disclosed herein. In some examples, aspects of the operations of 1315 may be performed by a second buffer component 630 or a second buffer component 1030 as described with reference to FIGS. 6 and 10.

At 1320, the method may include receiving a first set of one or more network coding messages over the wireless channel, where receiving the first set of one or more network coding messages includes decoding the first set of one or more network coding messages based on the first set of TBs in the first buffer. The operations of 1320 may be performed in accordance with examples as disclosed herein. In some examples, aspects of the operations of 1320 may be performed by a network coding component 635 or a network coding component 1035 as described with reference to FIGS. 6 and 10.

At 1325, the method may include transmitting a second set of one or more network coding messages corresponding to a portion of the second set of TBs in the second buffer, where the portion is selected based on the first set of one or more network coding messages. The operations of 1325 may be performed in accordance with examples as disclosed herein. In some examples, aspects of the operations of 1325 may be performed by a TB selection component 640 or a TB selection component 1040 as described with reference to FIGS. 6 and 10.

The following provides an overview of aspects of the present disclosure:

Aspect 1: A method for wireless communication at a network node, comprising: storing in a first buffer a first set of TBs received at the network node over a wireless channel during a first time window; storing in a second buffer a second set of TBs received at the network node over the wireless channel during a second time window according to at least one monitoring criterion; receiving a first set of one or more network coding messages over the wireless channel, wherein receiving the first set of one or more network coding messages comprises decoding the first set of one or more network coding messages based at least in part on the first set of TBs in the first buffer; and transmitting a second set of one or more network coding messages corresponding to a portion of the second set of TBs in the second buffer, wherein the portion is selected based at least in part on the first set of one or more network coding messages.

Aspect 2: The method of aspect 1, further comprising: receiving a control message comprising an indication of the first time window, the second time window, or both.

Aspect 3: The method of aspect 2, wherein the first time window corresponds to a first value and the second time window corresponds to a second value, the first value being equal to or greater than the second value and the first value and the second value being less than a third value corresponding to a maximum duration for buffering TBs.

Aspect 4: The method of any of aspects 1 through 3, wherein the first time window, the second time window, or both, are associated with a resource pool of a plurality of resource pools, and the plurality of resource pools is associated with transmitting network coding messages, receiving the network coding messages, or both.

Aspect 5: The method of any of aspects 1 through 4, wherein the first set of TBs is stored in the first buffer during the first time window irrespective of a decoding status of one or more TBs of the first set of TBs, the decoding status corresponding to decoding of the one or more TBs at one or more intended recipients of the one or more TBs.

Aspect 6: The method of any of aspects 1 through 5, further comprising: storing at least one TB of the second set of TBs in the second buffer based at least in part on a receive time of the at least one TB and a packet delay budget, the at least one monitoring criterion comprising the packet delay budget.

Aspect 7: The method of any of aspects 1 through 6, further comprising: storing at least one TB of the second set of TBs in the second buffer based at least in part on a location of a device associated with the at least one TB, the at least one monitoring criterion comprising the location.

Aspect 8: The method of any of aspects 1 through 7, further comprising: storing at least one TB of the second set of TBs in the second buffer based at least in part on a device ID associated with the at least one TB, the at least one monitoring criterion comprising the device ID.

Aspect 9: The method of any of aspects 1 through 8, further comprising: receiving a message instructing the network node to refrain from using TBs of a first TB type for decoding network coding messages; and storing at least one TB of the second set of TBs in the second buffer based at least in part on the at least one TB being of a type different from the first TB type, the at least one monitoring criterion comprising the first TB type.

Aspect 10: The method of any of aspects 1 through 9, further comprising: monitoring for network coding messages, wherein receiving the first set of one or more network coding messages over the wireless channel is based at least in part on the monitoring.

Aspect 11: The method of aspect 10, further comprising: decoding a network coding message of the first set of one or more network coding messages to obtain at least one TB of the network coding message; and storing the at least one TB of the network coding message in the second buffer based at least in part on the decoding.

Aspect 12: The method of any of aspects 10 through 11, further comprising: updating the second buffer by erasing at least one TB of the second set of TBs based at least in part on the first set of one or more network coding messages comprising a network coding message that includes the at least one TB.

Aspect 13: The method of any of aspects 10 through 12, further comprising: updating the second buffer by erasing at least one TB of the second set of TBs based at least in part on the first set of one or more network coding messages comprising a feedback collection message that includes the at least one TB.

Aspect 14: The method of any of aspects 10 through 13, further comprising: receiving an ACK message transmitted to a device capable of performing network coding; and updated the second buffer based at least in part on receiving the ACK message.

Aspect 15: The method of aspect 14, wherein updating the second buffer comprises: erasing at least one TB of the second set of TBs based at least in part on determining that the ACK message corresponds to the at least one TB.

Aspect 16: The method of any of aspects 1 through 15, further comprising: receiving a number of ACK messages transmitted to one or more devices capable of performing network coding, wherein the portion of the second set of TBs is further selected based at least in part on the number of ACK messages.

Aspect 17: The method of aspect 16, wherein the portion of the second set of TBs corresponds to a first value based at least in part on the number of ACK messages being greater than a threshold; and the portion of the second set of TBs corresponds to a second value based at least in part on the number of ACK messages being less than the threshold, the first value being less than the second value.

Aspect 18: The method of any of aspects 1 through 17, further comprising: receiving a first message including a request for the network node to transmit a network coding message; and transmitting a second message accepting the request or refraining from transmitting the second message based at least in part on a difference between a number of devices capable of performing network coding and a threshold.

Aspect 19: The method of aspect 18, further comprising: transmitting the second message based at least in part on the number of devices capable of performing the network coding being less than the threshold.

Aspect 20: The method of any of aspects 18 through 19, further comprising: receiving a message comprising an indication of the threshold, the message being a control message or a broadcast message.

Aspect 21: The method of any of aspects 1 through 20, wherein transmitting the second set of one or more network coding messages comprises: transmitting the second set of one or more network coding messages using a set of one or more dedicated resources for transmitting network coding messages.

Aspect 22: The method of aspect 21, further comprising: receiving a control message comprising an indication of the set of one or more dedicated resources, wherein transmitting the second set of one or more network coding messages is based at least in part on the indication.

Aspect 23: The method of any of aspects 21 through 22, further comprising: transmitting a sidelink control message to reserve one or more resources for performing sidelink communications, wherein the set of one or more dedicated resources comprises the one or more resources.

Aspect 24: An apparatus for wireless communication at a network node, comprising a processor; memory coupled with the processor; and instructions stored in the memory and executable by the processor to cause the apparatus to perform a method of any of aspects 1 through 23.

Aspect 25: An apparatus for wireless communication at a network node, comprising at least one means for performing a method of any of aspects 1 through 23.

Aspect 26: A non-transitory computer-readable medium storing code for wireless communication at a network node, the code comprising instructions executable by a processor to perform a method of any of aspects 1 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a network node, comprising:
   one or more memories storing processor-executable code; and
   one or more processors coupled with the one or more memories and individually or collectively operable to execute the code to cause the apparatus to:
   store, in a first buffer for decoding network coding messages, a first set of transport blocks (TBs) received at the network node over a wireless channel during a first time window;
   store, in a second buffer for selecting TBs for network coding messages to be transmitted by the network node, a second set of TBs received at the network node over the wireless channel during a second time window according to at least one monitoring criterion;

receive a first set of one or more network coding messages over the wireless channel, wherein receiving the first set of one or more network coding messages comprises decoding the first set of one or more network coding messages based at least in part on the first set of TBs in the first buffer; and transmit a second set of one or more network coding messages corresponding to a portion of the second set of TBs in the second buffer, wherein the portion is selected based at least in part on the first set of one or more network coding messages.

2. The apparatus of claim 1, wherein the one or more processors are individually or collectively further operable to execute the code to cause the apparatus to:

receive a control message comprising an indication of the first time window, the second time window, or both.

3. The apparatus of claim 2, wherein the first time window corresponds to a first value and the second time window corresponds to a second value, the first value being equal to or greater than the second value and the first value and the second value being less than a third value corresponding to a maximum duration for buffering TBs.

4. The apparatus of claim 1, wherein the first time window, the second time window, or both, are associated with a resource pool of a plurality of resource pools, and the plurality of resource pools is associated with transmitting network coding messages, receiving the network coding messages, or both.

5. The apparatus of claim 1, wherein the first set of TBs is stored in the first buffer during the first time window irrespective of a decoding status of one or more TBs of the first set of TBs, the decoding status corresponding to decoding of the one or more TBs at one or more intended recipients of the one or more TBs.

6. The apparatus of claim 1, wherein the one or more processors are individually or collectively further operable to execute the code to cause the apparatus to:

store at least one TB of the second set of TBs in the second buffer based at least in part on a receive time of the at least one TB and a packet delay budget, the at least one monitoring criterion comprising the packet delay budget.

7. The apparatus of claim 1, wherein the one or more processors are individually or collectively further operable to execute the code to cause the apparatus to:

store at least one TB of the second set of TBs in the second buffer based at least in part on a location of a device associated with the at least one TB, the at least one monitoring criterion comprising the location.

8. The apparatus of claim 1, wherein the one or more processors are individually or collectively further operable to execute the code to cause the apparatus to:

store at least one TB of the second set of TBs in the second buffer based at least in part on a device identifier associated with the at least one TB, the at least one monitoring criterion comprising the device identifier.

9. The apparatus of claim 1, wherein the one or more processors are individually or collectively further operable to execute the code to cause the apparatus to:

receive a message instructing the network node to refrain from using TBs of a first TB type for decoding network coding messages; and store at least one TB of the second set of TBs in the second buffer based at least in part on the at least one TB being of a type different from the first TB type, the at least one monitoring criterion comprising the first TB type.

10. The apparatus of claim 1, wherein the one or more processors are individually or collectively further operable to execute the code to cause the apparatus to:

monitor for network coding messages, wherein receiving the first set of one or more network coding messages over the wireless channel is based at least in part on the monitoring.

11. The apparatus of claim 10, wherein the one or more processors are individually or collectively further operable to execute the code to cause the apparatus to:

decode a network coding message of the first set of one or more network coding messages to obtain at least one TB of the network coding message; and store the at least one TB of the network coding message in the second buffer based at least in part on the decoding.

12. The apparatus of claim 10, wherein the one or more processors are individually or collectively further operable to execute the code to cause the apparatus to:

update the second buffer by erasing at least one TB of the second set of TBs based at least in part on the first set of one or more network coding messages comprising a network coding message that includes the at least one TB.

13. The apparatus of claim 10, wherein the one or more processors are individually or collectively further operable to execute the code to cause the apparatus to:

update the second buffer by erasing at least one TB of the second set of TBs based at least in part on the first set of one or more network coding messages comprising a feedback collection message that includes the at least one TB.

14. The apparatus of claim 10, wherein the one or more processors are individually or collectively further operable to execute the code to cause the apparatus to:

receive an acknowledgment message transmitted to a device capable of performing network coding; and update the second buffer based at least in part on receiving the acknowledgment message.

15. The apparatus of claim 14, wherein, to update the second buffer, the one or more processors are individually or collectively operable to execute the code to cause the apparatus to:

erase at least one TB of the second set of TBs based at least in part on determining that the acknowledgment message corresponds to the at least one TB.

16. The apparatus of claim 1, wherein the one or more processors are individually or collectively further operable to execute the code to cause the apparatus to:

receive a number of acknowledgment messages transmitted to one or more devices capable of performing network coding, wherein the portion of the second set of TBs is further selected based at least in part on the number of acknowledgment messages.

17. The apparatus of claim 16, wherein:

the portion of the second set of TBs corresponds to a first value based at least in part on the number of acknowledgment messages being greater than a threshold; and the portion of the second set of TBs corresponds to a second value based at least in part on the number of acknowledgment messages being less than the threshold, the first value being less than the second value.

18. The apparatus of claim 1, wherein the one or more processors are individually or collectively further operable to execute the code to cause the apparatus to:

receive a first message including a request for the network node to transmit a network coding message; and transmit a second message accepting the request or refraining from transmitting the second message based at least in part on a difference between a number of devices capable of performing network coding and a threshold.

19. The apparatus of claim 18, wherein the one or more processors are individually or collectively further operable to execute the code to cause the apparatus to:

transmit the second message based at least in part on the number of devices capable of performing the network coding being less than the threshold.

20. The apparatus of claim 18, wherein the one or more processors are individually or collectively further operable to execute the code to cause the apparatus to:

receive a message comprising an indication of the threshold, the message being a control message or a broadcast message.

21. The apparatus of claim 1, wherein, to transmit the second set of one or more network coding messages, the one or more processors are individually or collectively operable to execute the code to cause the apparatus to:

transmit the second set of one or more network coding messages using a set of one or more dedicated resources for transmitting network coding messages.

22. The apparatus of claim 21, wherein the one or more processors are individually or collectively further operable to execute the code to cause the apparatus to:

receive a control message comprising an indication of the set of one or more dedicated resources, wherein transmitting the second set of one or more network coding messages is based at least in part on the indication.

23. The apparatus of claim 21, wherein the one or more processors are individually or collectively further operable to execute the code to cause the apparatus to:

transmit a sidelink control message to reserve one or more resources for performing sidelink communications, wherein the set of one or more dedicated resources comprises the one or more resources.

24. A method for wireless communication by a network node, comprising:

storing, in a first buffer for decoding network coding messages, a first set of transport blocks (TBs) received at the network node over a wireless channel during a first time window;

storing, in a second buffer for selecting TBs for network coding messages to be transmitted by the network node, a second set of TBs received at the network node over the wireless channel during a second time window according to at least one monitoring criterion;

receiving a first set of one or more network coding messages over the wireless channel, wherein receiving the first set of one or more network coding messages comprises decoding the first set of one or more network coding messages based at least in part on the first set of TBs in the first buffer; and transmitting a second set of one or more network coding messages corresponding to a portion of the second set of TBs in the second buffer, wherein the portion is selected based at least in part on the first set of one or more network coding messages.

25. The method of claim 24, further comprising:

receiving a control message comprising an indication of the first time window, the second time window, or both.

26. The method of claim 25, wherein the first time window corresponds to a first value and the second time window corresponds to a second value, the first value being equal to or greater than the second value and the first value and the second value being less than a third value corresponding to a maximum duration for buffering TBs.

27. The method of claim 24, wherein the first time window, the second time window, or both, are associated with a resource pool of a plurality of resource pools, and the plurality of resource pools is associated with transmitting network coding messages, receiving the network coding messages, or both.

28. The method of claim 24, wherein the first set of TBs is stored in the first buffer during the first time window irrespective of a decoding status of one or more TBs of the first set of TBs, the decoding status corresponding to decoding of the one or more TBs at one or more intended recipients of the one or more TBs.

29. The method of claim 24, further comprising:

storing at least one TB of the second set of TBs in the second buffer based at least in part on a receive time of the at least one TB and a packet delay budget, the at least one monitoring criterion comprising the packet delay budget.

30. The method of claim 24, further comprising:

storing at least one TB of the second set of TBs in the second buffer based at least in part on a location of a device associated with the at least one TB, the at least one monitoring criterion comprising the location.

* * * * *